US009542777B2

(12) United States Patent
Yamaguchi

(10) Patent No.: US 9,542,777 B2
(45) Date of Patent: Jan. 10, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hiroichi Yamaguchi, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 14/082,569

(22) Filed: Nov. 18, 2013

(65) Prior Publication Data
US 2014/0146083 A1 May 29, 2014

(30) Foreign Application Priority Data

Nov. 26, 2012 (JP) ................................ 2012-257947
Mar. 29, 2013 (JP) ................................ 2013-074022

(51) Int. Cl.
G09G 5/02 (2006.01)
G06T 19/00 (2011.01)
(Continued)

(52) U.S. Cl.
CPC ........... *G06T 19/006* (2013.01); *G02B 27/017* (2013.01); *G06T 15/503* (2013.01);
(Continued)

(58) Field of Classification Search
None
See application file for complete search history.

(56) References Cited

U.S. PATENT DOCUMENTS

2005/0110803 A1    5/2005 Sugimura
2005/0212820 A1*   9/2005 Liu et al. ..................... 345/620
(Continued)

FOREIGN PATENT DOCUMENTS

JP    2005-107780 A    4/2005

OTHER PUBLICATIONS

Alvy Ray Smith and James F. Blinn, "Blue Screen Matting", SIGGRAPH '96 Proceedings of the 23rd annual conference on Computer graphics and interactive techniques, Aug. 1996, pp. 259-268 , ACM New York, NY, USA ©1996, http://alvyray.com/papers/cg/blusig96.pdf.*

*Primary Examiner* — Tize Ma
(74) *Attorney, Agent, or Firm* — Fitzpatrick, Cella, Harper & Scinto

(57) ABSTRACT

An image processing apparatus, which determines, for a combined image obtained by combining pixels of a given first image and pixels of an unknown second image either translucently or non-translucently using an unknown coefficient indicating a transparency, whether each of pixels included in the combined image is a translucently combined pixel, is provided. The image processing apparatus calculates, from pixel values of the combined image and the first image of respective pixels in a predetermined area including one pixel, pixel values of an image corresponding to the second image, calculates a total of differences between the calculated pixel values, identifies a coefficient used to obtain the combined image from the total of the difference, and determines that the one pixel is a translucently combined pixel when a value of the identified coefficient is larger than a predetermined value.

27 Claims, 31 Drawing Sheets

(51) Int. Cl.
*G06T 15/50* (2011.01)
*G02B 27/01* (2006.01)

(52) U.S. Cl.
CPC *G02B 2027/014* (2013.01); *G02B 2027/0112* (2013.01); *G02B 2027/0138* (2013.01); *G02B 2027/0178* (2013.01); *G06T 2210/62* (2013.01)

(56) References Cited

U.S. PATENT DOCUMENTS

2007/0165966 A1\* 7/2007 Weiss et al. .................. 382/284
2014/0119643 A1\* 5/2014 Price et al. .................... 382/164

\* cited by examiner

FIG. 4
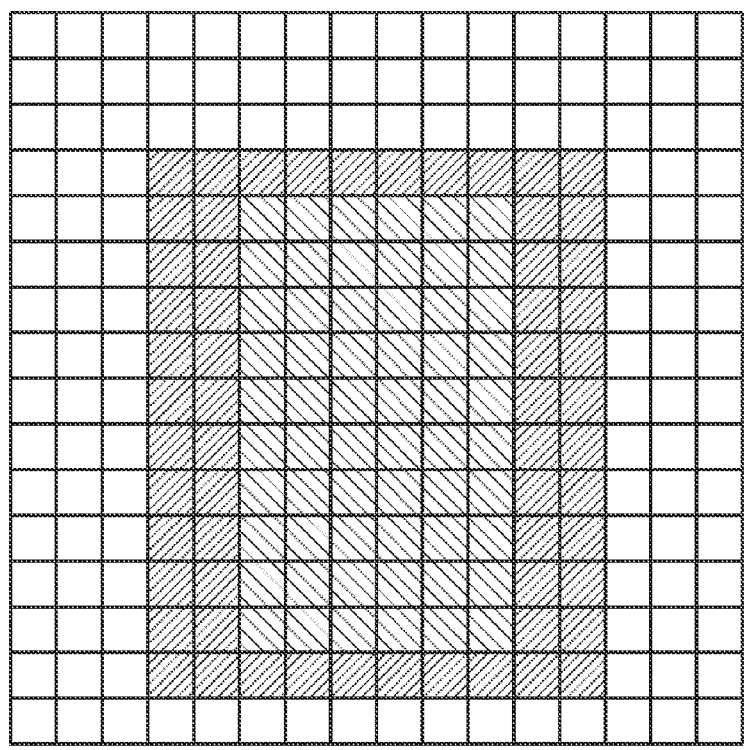
401 
402 
403 

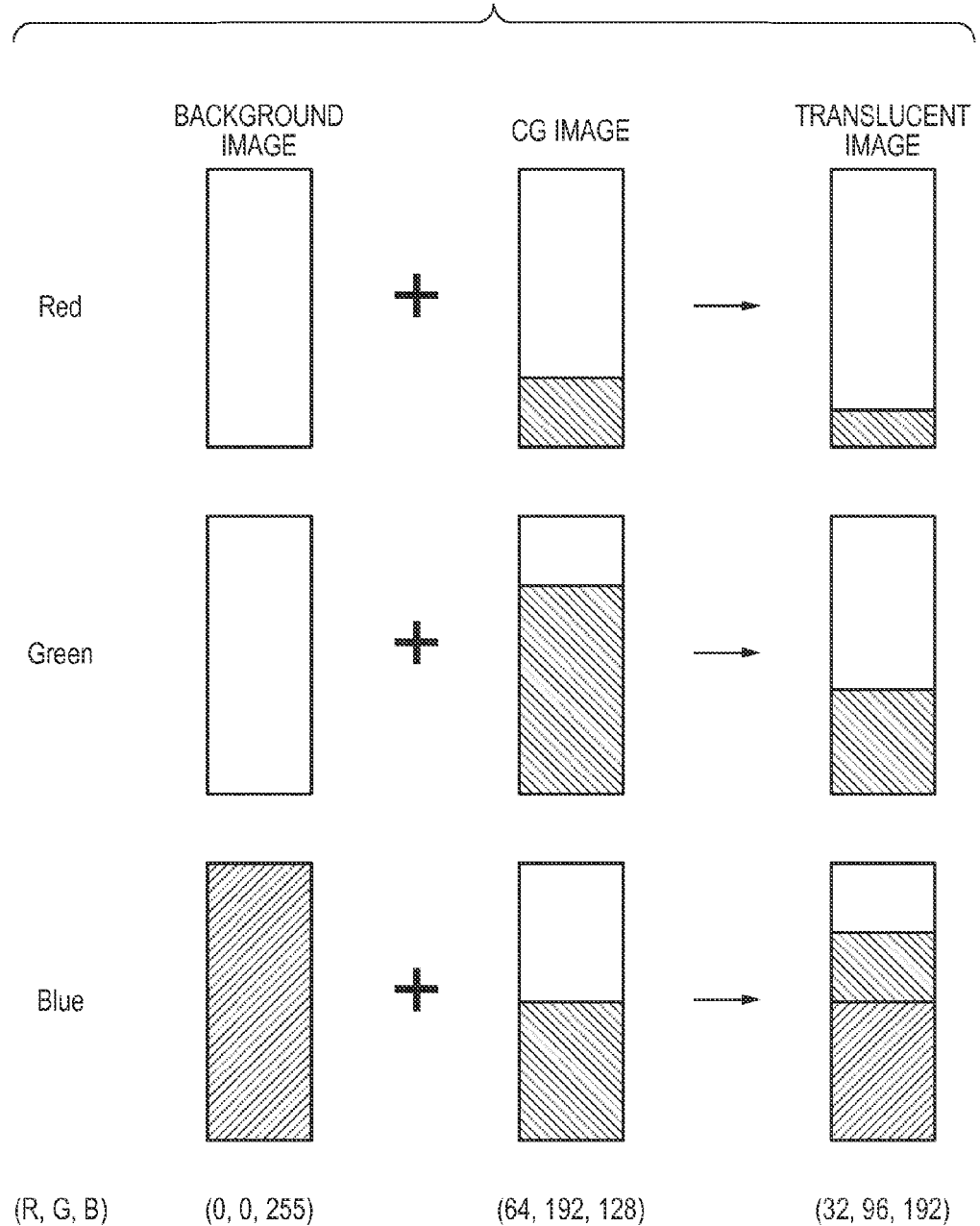

FIG. 7A
CG IMAGE

| R=101 G=82 B=40 | R=103 G=77 B=39 | R=101 G=81 B=41 |
|---|---|---|
| R=100 G=78 B=38 | R=101 G=82 B=38 | R=100 G=80 B=38 |
| R=99 G=80 B=39 | R=99 G=81 B=41 | R=97 G=76 B=36 |

FIG. 7B
BACKGROUND IMAGE

| R=50 G=80 B=110 | R=80 G=50 B=20 | R=150 G=20 B=70 |
|---|---|---|
| R=50 G=80 B=110 | R=80 G=50 B=20 | R=150 G=20 B=70 |
| R=50 G=80 B=110 | R=80 G=50 B=20 | R=150 G=20 B=70 |

FIG. 7C
RECEIVED IMAGE(α=0.5)

| R=76 G=81 B=75 | R=92 G=64 B=30 | R=126 G=51 B=56 |
|---|---|---|
| R=75 G=79 B=74 | R=91 G=66 B=29 | R=125 G=50 B=54 |
| R=75 G=80 B=75 | R=90 G=66 B=31 | R=124 G=48 B=53 |

FIG. 7D
CG PIXEL VALUE WHEN α=0.7
DIFFERENCE BETWEEN TARGET
PIXEL AND SURROUNDING PIXEL : 589

| R=137 G=83 B=0 | R=120 G=97 B=53 | R=70 G=123 B=23 |
|---|---|---|
| R=133 G=77 B=0 | R=117 G=103 B=50 | R=67 G=120 B=17 |
| R=133 G=80 B=0 | R=113 G=103 B=57 | R=63 G=113 B=13 |

FIG. 7E
CG PIXEL VALUE WHEN α=0.5
DIFFERENCE BETWEEN TARGET
PIXEL AND SURROUNDING PIXEL : 48

| R=102 G=82 B=40 | R=104 G=78 B=40 | R=102 G=82 B=42 |
|---|---|---|
| R=100 G=78 B=38 | R=102 G=82 B=38 | R=100 G=80 B=38 |
| R=100 G=80 B=40 | R=100 G=82 B=42 | R=98 G=76 B=36 |

FIG. 7F
CG PIXEL VALUE WHEN α=0.3
DIFFERENCE BETWEEN TARGET
PIXEL AND SURROUNDING PIXEL : 271

| R=87 G=81 B=60 | R=97 G=70 B=34 | R=116 G=64 B=50 |
|---|---|---|
| R=86 G=79 B=59 | R=96 G=73 B=33 | R=114 G=63 B=47 |
| R=86 G=80 B=60 | R=94 G=73 B=36 | R=113 G=60 B=46 |

 PROCESSING TARGET PIXEL

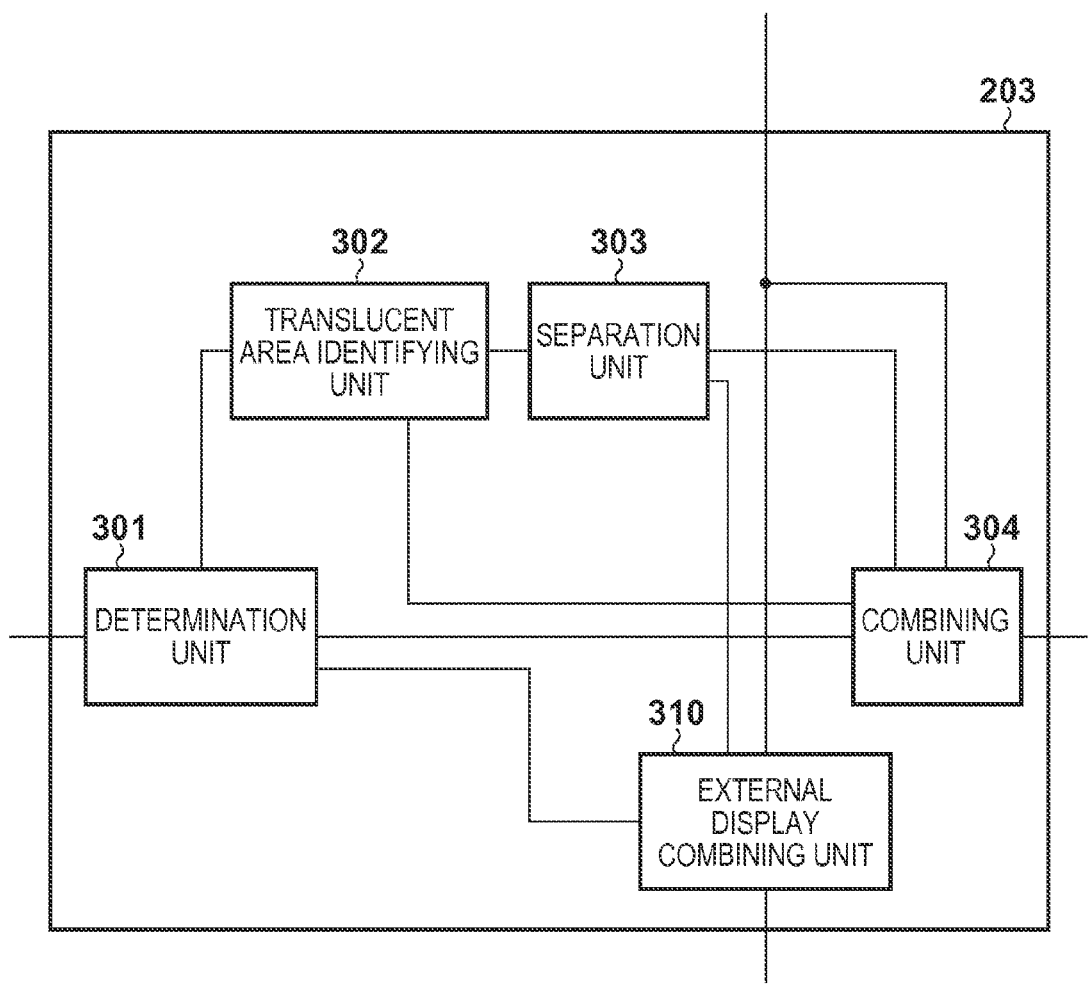
F I G. 11

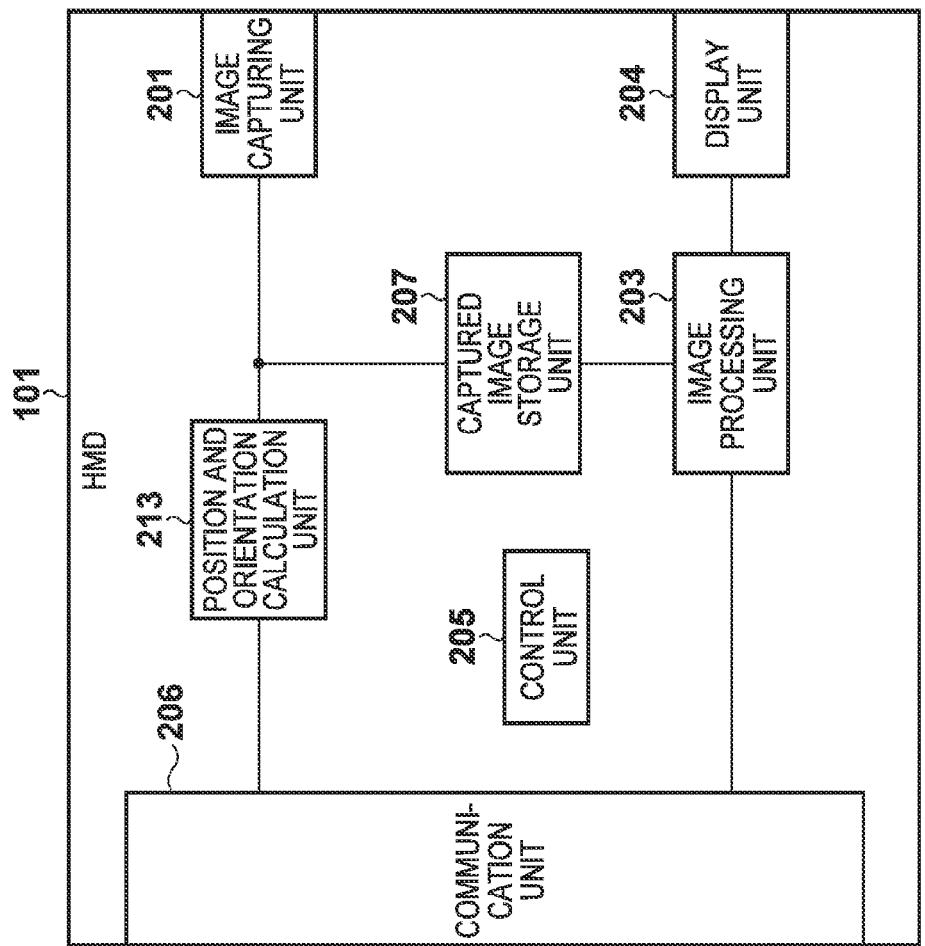
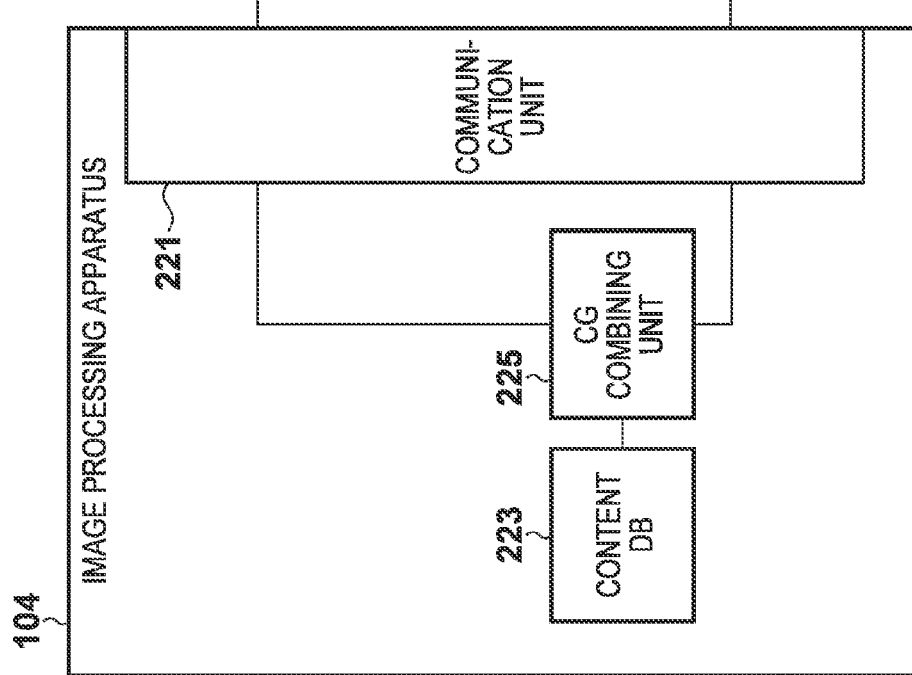
FIG. 19

FIG. 20
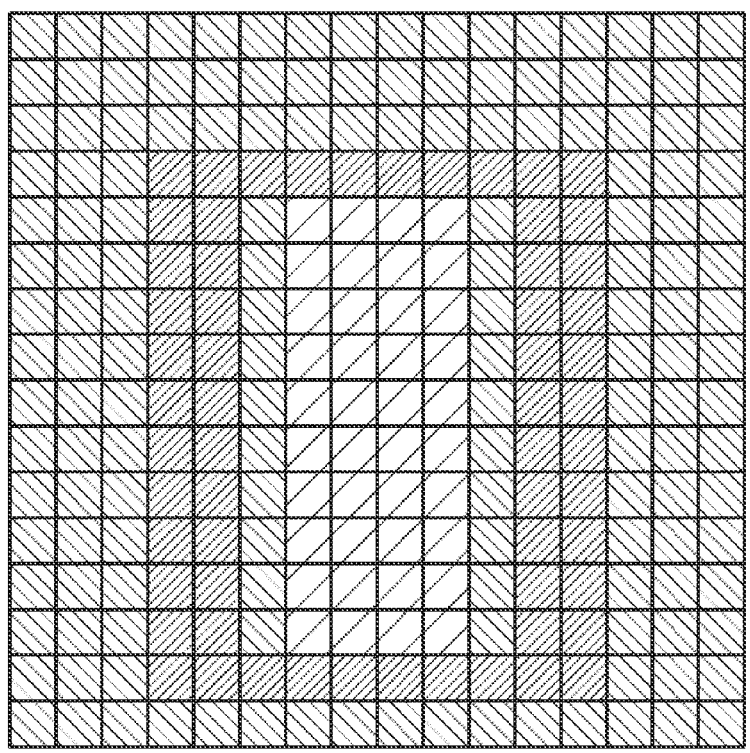
 2001
 2002
 2003
 2004

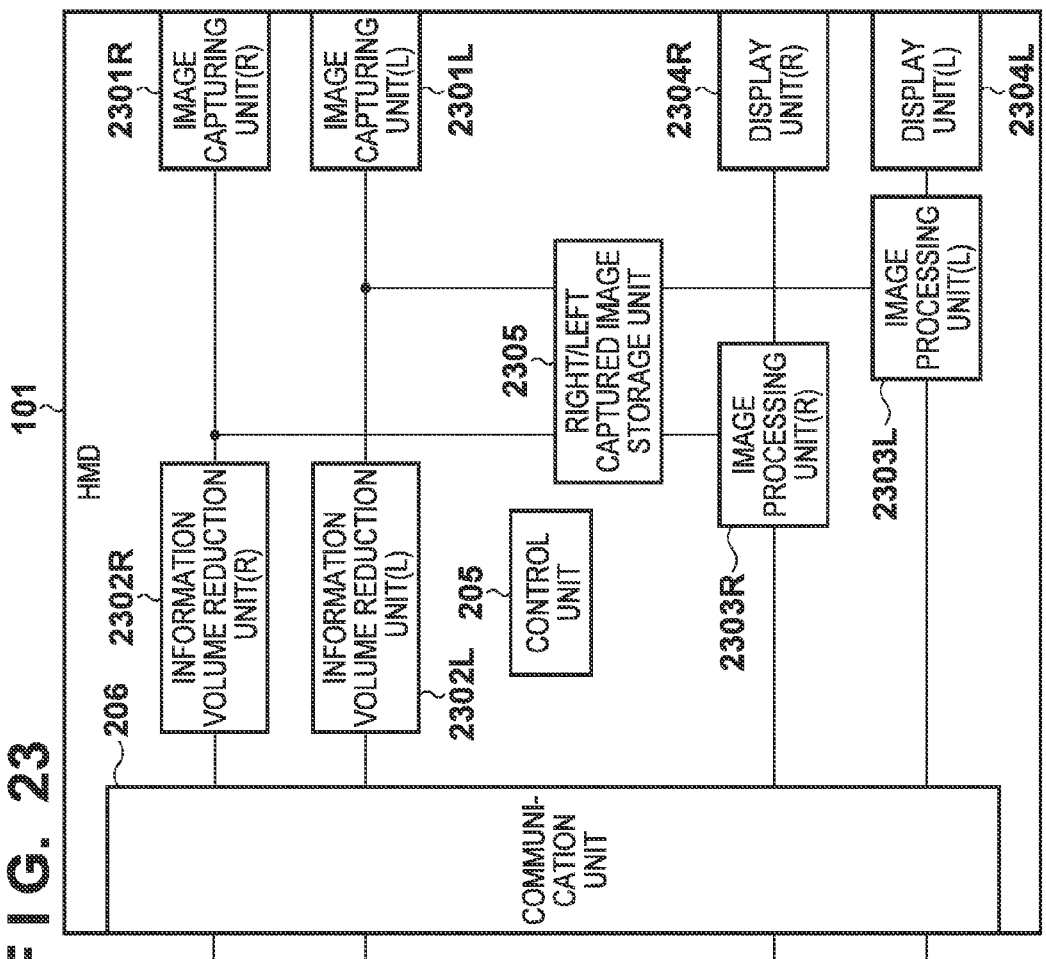
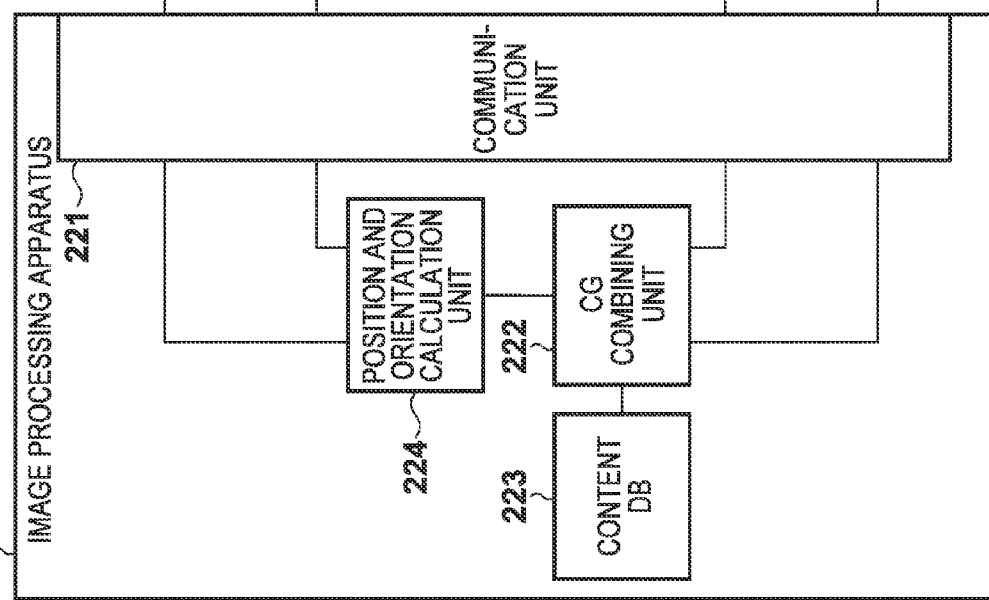
FIG. 23

IMAGE PROCESSING APPARATUS, IMAGE PROCESSING METHOD, AND STORAGE MEDIUM

BACKGROUND OF THE INVENTION

Field of the Invention

The present invention relates to an image processing technique in a mixed reality technique.

Description of the Related Art

As a technique for seamlessly merging a real world and virtual world, so-called MR (Mixed Reality) techniques are known. As one of the MR techniques, a technique which uses a video see-through HMD (Head Mounted Display) is known. In this method using the video see-through HMD, a video camera or the like captures an image of an object, which nearly coincides with that viewed from a pupil position of an HMD user, and the HMD user can view an image obtained by superposing a CG (Computer Graphics) on the captured image.

In the video see-through HMD, a charge-coupled element such as a CCD captures an image of an object to obtain digital image data of that object, and a CG image is superimposed on the captured image to generate an MR image (mixed reality image). Then, the generated MR image is displayed for the user via a display device such as a liquid crystal display or organic EL display. FIG. 30 shows a state in which the HMD user wears an HMD 3001. Although not shown in FIG. 30, an external apparatus is arranged in addition to the HMD 3001, and the HMD 3001 transmits position and orientation information of itself to the external apparatus. The external apparatus superimposes a CG on a blueback image based on the position and orientation information received from the HMD, and transmits that image to the HMD. The HMD superimposes the CG image received from the external apparatus on a captured image captured by the HMD, and displays that image. In this manner, the HMD user can experience an MR space using the HMD 3001.

Upon superimposing a CG image and an image captured by a camera, the CG image is often translucently superimposed on the image. For example, when the CG image includes an object such as a window, it is translucently chroma-key-combined with a camera image. By translucently chroma-key-combining the CG image, the HMD user can view a video as if an actually captured image were existing outside the window. In this case, a coefficient, which is required for translucent processing, is called an α value, and represents a transparency, is required in addition to the CG image.

FIGS. 31A to 31C show such example. FIG. 31A shows an image captured by a camera, and FIG. 31B shows a CG image. Reference numeral 3103 denotes an area which is translucently chroma-key-combined with the captured image; and 3102, an area where the captured image is replaced by the CG image when they are chroma-key-combined. FIG. 31C shows a chroma-key-combined result of FIGS. 31A and 31B. Since the area 3103 in FIG. 31C undergoes translucent chroma-key combination, the camera image is translucently displayed on this area.

In order to chroma-key-combine images acquired from different apparatuses like the HMD and external apparatus, a translucent area has to be separately transmitted as information. Japanese Patent Laid-Open No. 2005-107780 describes a method of reducing data of an α value by embedding the α value in image data.

However, since the technique described in Japanese Patent Laid-Open No. 2005-107780 embeds the α value in data of an image, color information of the image is smaller than that before the α value is embedded.

The present invention has been made in consideration of the aforementioned problem, and provides a technique for identifying a translucent area and information indicating its transparency without reducing an information amount of an image in association with a CG image including the translucent area.

SUMMARY OF THE INVENTION

According to one aspect of the present invention, there is provided an image processing apparatus, which determines, for a combined image obtained by combining pixels of a given first image and pixels of an unknown second image either translucently or non-translucently using an unknown coefficient indicating a transparency, whether each of pixels included in the combined image is a translucently combined pixel, the apparatus comprising: a calculation unit configured to calculate, from pixel values of the combined image and pixel values of the first image of respective pixels in a predetermined area including one pixel, pixel values of an image corresponding to the second image when each of a plurality of values is used as the coefficient, and to calculate a total of differences between the pixel values of the one pixel and other pixels included in the predetermined area in the image corresponding to the second image; an estimation unit configured to estimate, based on totals of the differences corresponding to the plurality of values of the coefficient, the coefficient used for the one pixel to obtain the combined image; and a determination unit configured to determine that the one pixel is a pixel obtained by translucently combining the pixel value of the first image and the pixel value of the second image when the estimated value of the coefficient is larger than a predetermined value.

According to another aspect of the present invention, there is provided an image processing method, which determines, for a combined image obtained by combining pixels of a given first image and pixels of an unknown second image either translucently or non-translucently using an unknown coefficient indicating a transparency, whether each of pixels included in the combined image is a translucently combined pixel, the method comprising: calculating, from pixel values of the combined image and pixel values of the first image of respective pixels in a predetermined area including one pixel, pixel values of an image corresponding to the second image when each of a plurality of values is used as the coefficient, and to calculate a total of differences between the pixel values of the one pixel and other pixels included in the predetermined area in the image corresponding to the second image; estimating, based on totals of the differences corresponding to the plurality of values of the coefficient, the coefficient used for the one pixel to obtain the combined image; and determining that the one pixel is a pixel obtained by translucently combining the pixel value of the first image and the pixel value of the second image when the estimated value of the coefficient is larger than a predetermined value.

According to still another aspect of the present invention, there is provided an image processing apparatus comprising: a receiving unit configured to receive a captured image obtained by capturing an image of an external world from an image capturing unit; a storage unit configured to store the captured image received by the receiving unit; a reduction unit configured to reduce an information volume of the captured image received by the receiving unit; an acquisition unit configured to acquire a combined image obtained by combining the captured image, the information volume of which is reduced by the reduction unit, and a CG image; an identifying unit configured to identify a translucent area, which was translucently combined, from the combined image acquired by the acquisition unit; a separation unit configured to separate the captured image, the information volume of which is reduced, and the CG image in the translucent area identified by the identifying unit; and a recombining unit configured to recombine an area of the captured image separated by the separation unit and an area corresponding to the captured image of an area which is not identified as the translucent area by the identifying unit by replacing the areas by the captured image stored in the storage unit, wherein the separation unit is configured to calculate a transparency in the translucent area using a target pixel in the translucent area and surrounding pixels which surround the target pixel, and to separate the captured image, the information volume of which is reduced, and the CG image based on the calculated transparency.

According to yet another aspect of the present invention, there is provided an image processing apparatus comprising: a receiving unit configured to receive a captured image obtained by capturing an image of an external world from an image capturing unit; a storage unit configured to store the captured image received by the receiving unit; an acquisition unit configured to acquire an image combined with a CG image from an external apparatus; an identifying unit configured to identify a translucent area, which was translucently combined, from the combined image acquired by the acquisition unit; a separation unit configured to separate the CG image and an image other than the CG image in the translucent area identified by the identifying unit; and a recombining unit configured to recombine an area of the image other than the CG image separated by the separation unit and an area which does not correspond to the CG image of an area which is not identified as the translucent area by the identifying unit by replacing the areas by the captured image stored in the storage unit, wherein the separation unit is configured to calculate a transparency in the translucent area using a target pixel in the translucent area and surrounding pixels which surround the target pixel, and to separate the CG image and the image other than the CG image based on the calculated transparency.

According to still another aspect of the present invention, there is provided an image processing method for an image processing apparatus, which includes a storage unit configured to store a captured image, the method comprising: receiving a captured image obtained by capturing an image of an external world from an image capturing unit; saving the captured image received in the receiving to the storage unit; reducing an information volume of the captured image received in the receiving; acquiring a combined image obtained by combining the captured image, the information volume of which is reduced in the reducing, and a CG image; identifying a translucent area, which was translucently combined, from the combined image acquired in the acquiring; separating the captured image, the information volume of which is reduced, and the CG image in the translucent area identified in the identifying; and recombining an area of the captured image separated in the separating and an area corresponding to the captured image of an area which is not identified as the translucent area in the identifying by replacing these areas by the captured image saved to the storage unit, wherein in the separating, a transparency in the translucent area is calculated using a target pixel in the translucent area and surrounding pixels which surround the target pixel, and the captured image, the information volume of which is reduced, and the CG image are separated based on the calculated transparency.

According to yet another aspect of the present invention, there is provided an image processing method for an image processing apparatus, which includes a storage unit configured to store a captured image, the method comprising: receiving a captured image obtained by capturing an image of an external world from an image capturing unit; saving the captured image received in the receiving to the storage unit; acquiring a combined image combined with a CG image from an external apparatus; identifying a translucent area, which was translucently combined, from the combined image acquired in the acquiring; separating the CG image and an image other than the CG image in the transparent area identified in the identifying; and recombining an area of the image other than the CG image separated in the separating and an area which does not correspond to the CG image of an area which is not identified as the translucent area in the identifying by replacing these areas by the captured image saved to the storage unit, wherein in the separating, a transparency in the translucent area is calculated using a target pixel in the translucent area and surrounding pixels which surround the target pixel, and the CG image and the image other than the CG image are separated based on the calculated transparency.

Further features of the present invention will become apparent from the following description of exemplary embodiments with reference to the attached drawings.

BRIEF DESCRIPTION OF THE DRAWINGS

FIG. 4 is a schematic view showing a CG image received from the image processing apparatus by the HMD;

FIG. 5 is a view showing the concept of translucent combination between a blueback image and CG image;

FIGS. 7A to 7F are views showing an overview of translucent area determination processing for a translucent image of a CG image and background image;

FIG. 11 is a block diagram showing an example of the functional arrangement of an image processing unit according to the second embodiment;

FIG. 19 is a block diagram showing an example of the arrangement of an HMD and image processing apparatus according to the fourth embodiment;

FIG. 20 is a schematic view showing an example of a combined image received from the image processing apparatus in the fourth embodiment;

FIG. 23 is a block diagram showing an example of the arrangement of an HMD and image processing apparatus according to the fifth embodiment;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment (Arrangement of System)

Figure 1:
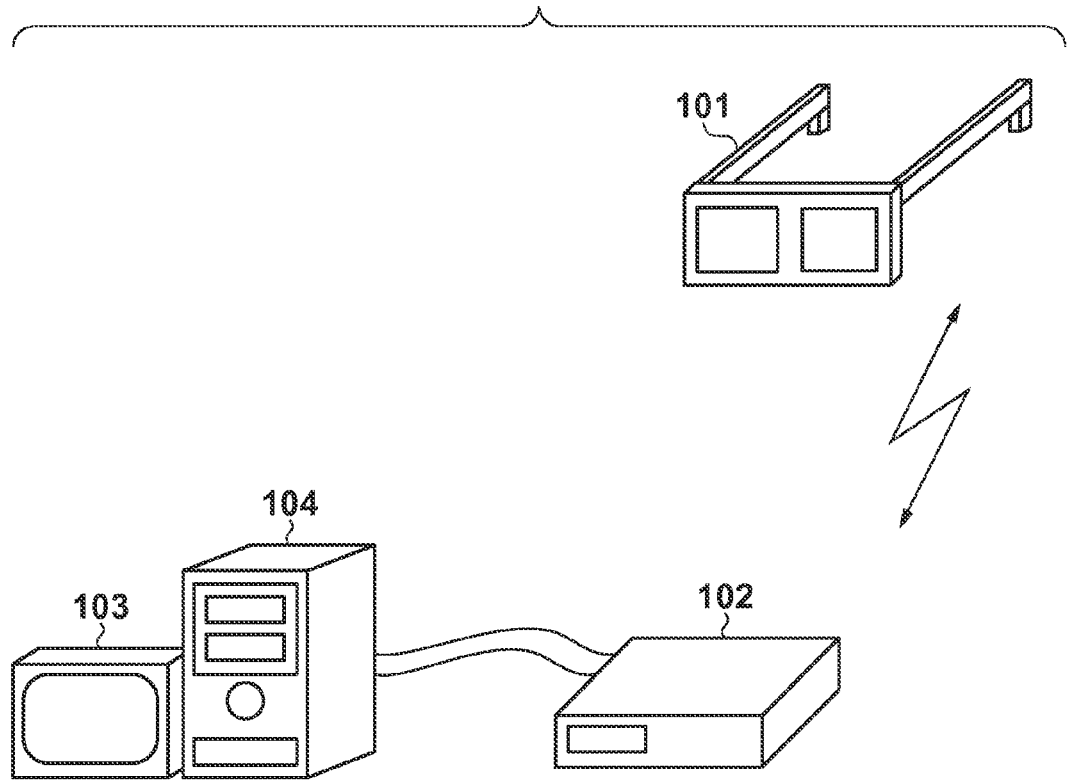
FIG. 1 is a view showing an example of the arrangement of an image display system.

FIG. 1 is a view showing an example of the arrangement of an image display system according to this embodiment. The image display system includes an HMD 101, which serves as both a head-mounted image display apparatus and an image processing apparatus used to execute image processing, a controller 102, and an image processing apparatus 104 having a display unit 103.

The user wears the HMD 101 on the head, and the HMD 101 includes an image display unit, a communication unit which communicates with the controller 102, a control unit which controls these units, and the like. The image display unit displays an image generated by the image processing apparatus 104. The image display unit includes an optical system, and is arranged in front of each of the right and left eyes of the user. The HMD 101 communicates with the controller 102. The controller 102 configures, for example, a small-scale network such as a WLAN (Wireless Local Area Network) or WPAN (Wireless Personal Area Network), and makes wireless communications with the HMD 101. Note that the communications between the HMD 101 and controller 102 may be wired communications in place of the wireless communications.

The image processing apparatus 104 connected to the controller 102 via a cable includes, for example, a reproduction unit which reproduces an image, and a storage unit which stores an image to be reproduced. The image processing apparatus 104 communicates with the HMD 101 via the controller 102. Also, the image processing apparatus 104 includes a keyboard and the like, which are used to input data, instructions, and the like, and the display unit 103 displays processing results corresponding to the input data and instructions, and the like.

As illustrated in FIG. 1, the image processing apparatus 104 and controller 102 are implemented by independent hardware units. Alternatively, functions of the controller 102 may be incorporated in the image processing apparatus 104 to integrate these apparatuses. Alternatively, functions of the image processing apparatus 104 and controller 102 may be collected to configure a dedicated image processing apparatus.

(Arrangement of Apparatuses in System)

Figure 2:
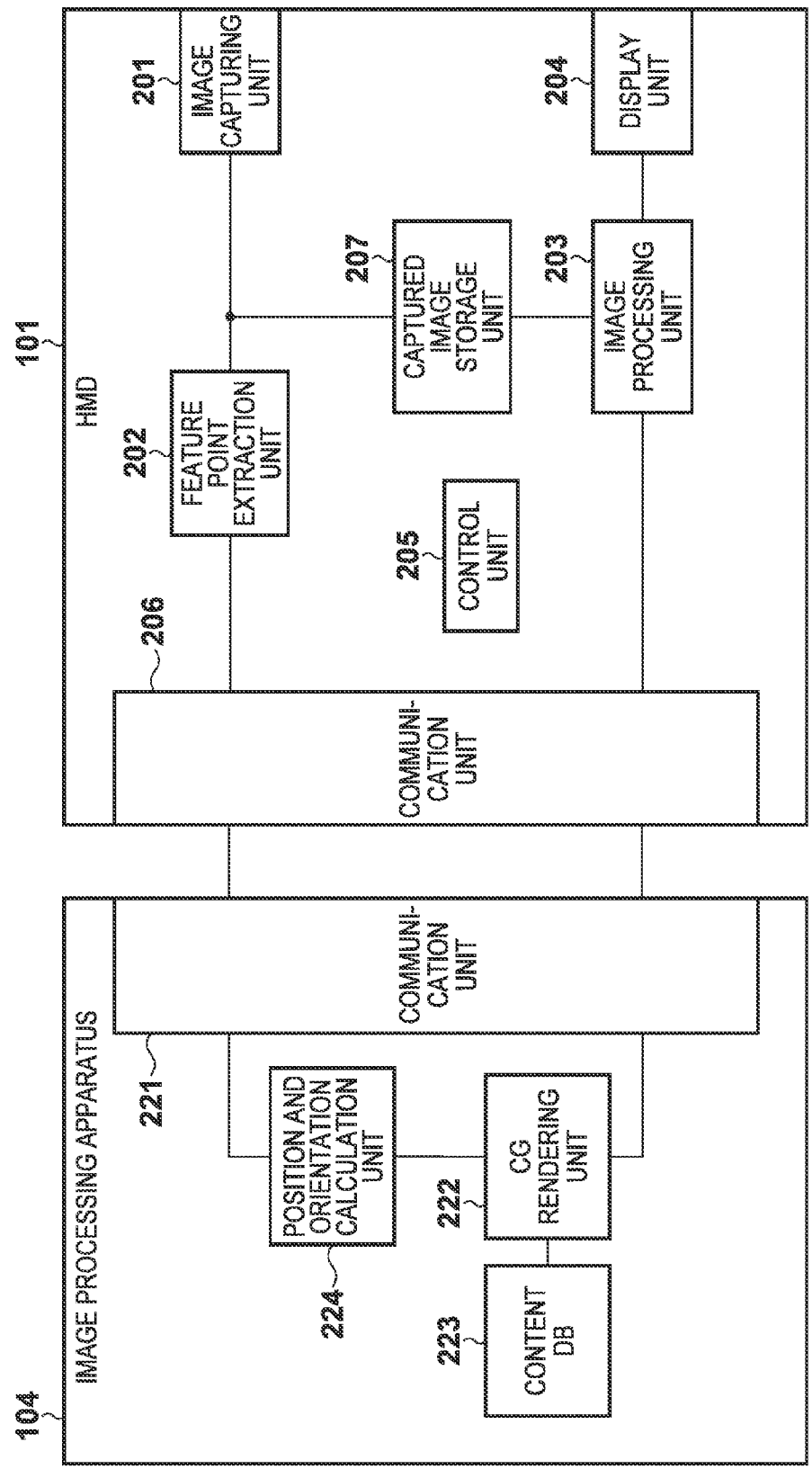
FIG. 2 is a block diagram showing an example of the functional arrangement of an image processing apparatus and HMD.

FIG. 2 is a schematic block diagram showing the functional arrangement of the image processing apparatus and HMD in the image display system shown in FIG. 1. The HMD 101 includes, for example, an image capturing unit 201, feature point extraction unit 202, image processing unit 203, display unit 204, control unit 205, communication unit 206, and captured image storage unit 207. The image processing apparatus 104 is implemented in an external apparatus such as a PC or workstation, which is different from the HMD 101, and includes, for example, a communication unit 221, CG rendering unit 222, content database (DB) 223, and position and orientation calculation unit 224.

The image capturing unit 201 of the HMD 101 captures an observation target to acquire an image. The feature point extraction unit 202 extracts information required to calculate a position and orientation of the HMD from the image captured by the image capturing unit 201. The image processing unit 203 applies processing to an externally received and acquired image, and the display unit 204 displays an image. The control unit 205 controls the respective function units of the HMD 101, and the communication unit 206 exchanges an image and control signals with the image processing apparatus 104. The captured image storage unit 207 temporarily stores an image captured by the image capturing unit 201 in a memory. Note that the HMD 101 may include other function units (not shown).

The communication unit 221 of the image processing apparatus 104 exchanges an image, control signals, and the like with the HMD 101. The content DB 223 stores color graphics (CG) contents, and the CG rendering unit 222 renders a color graphics image (CG image) stored in the content DB. The position and orientation calculation unit 224 calculates the position and orientation of the HMD 101 from feature point information of a captured image received from the HMD 101.

Note that the arrangement in which feature point information is transmitted from the HMD 101 to the image processing apparatus 104, and the position and orientation calculation unit 224 of the image processing apparatus 104 calculates the position and orientation information of the HMD will be described below. However, the present invention is not limited to this. For example, the position and orientation calculation unit 224 of the image processing apparatus 104 may be incorporated in the HMD 101, the HMD 101 may generate its own position and orientation information, and that position and orientation information may be transmitted from the HMD 101 to the image processing apparatus 104.

In the aforementioned arrangement, the feature point extraction unit 202 of the HMD 101 extracts feature points of an image captured by the image capturing unit 201. Extracted feature point information is then transmitted to the image processing apparatus 104 via the communication unit 206. The position and orientation calculation unit 224 of the image processing apparatus 104 calculates the position and orientation of the HMD 101 from the received position and orientation information. The CG rendering unit 222 renders a CG based on the position and orientation of the HMD 101 calculated by the position and orientation calculation unit 224. After that, the image processing apparatus 104 transmits the rendered CG image to the HMD 101 via the communication unit 221. The image processing unit 203 of the HMD 101 combines the acquired CG image received from the image processing apparatus 104 and an image captured by the image capturing unit 201, and the display unit 204 displays the combined image.

Note that in this embodiment, a CG image is an image obtained by combining a first image (background image) and second image (CG image) translucently or non-translucently using a coefficient (α value) indicating a transparency, as will be described later. That is, a received image is that having pixel values of a background image in pixels which do not display any CG, pixel values of a CG in pixels which display a non-translucent CG, and pixel values obtained from the background image pixels, CG image pixels, and α value for these pixels in translucent pixels. Then, the HMD 101 identifies pixel values of the CG image related to a CG display part and the coefficient indicating their transparency, and generates a combined image using a captured image and the specified pixel values of the CG image. In this manner, the user of the HMD 101 can view an image obtained by combining a CG rendered by the image processing apparatus 104 and a captured image.

In this embodiment, the CG rendering unit 222 of the image processing apparatus 104 renders a CG on, for example, a blueback image, but a background image used to render a CG is not limited to this. For example, an image having a predetermined pattern may be used as a background image. That is, the background image is not particularly limited as long as the HMD 101 and image processing apparatus 104 recognize the same background image.

(Arrangement of Image Processing Unit)

Figure 3:
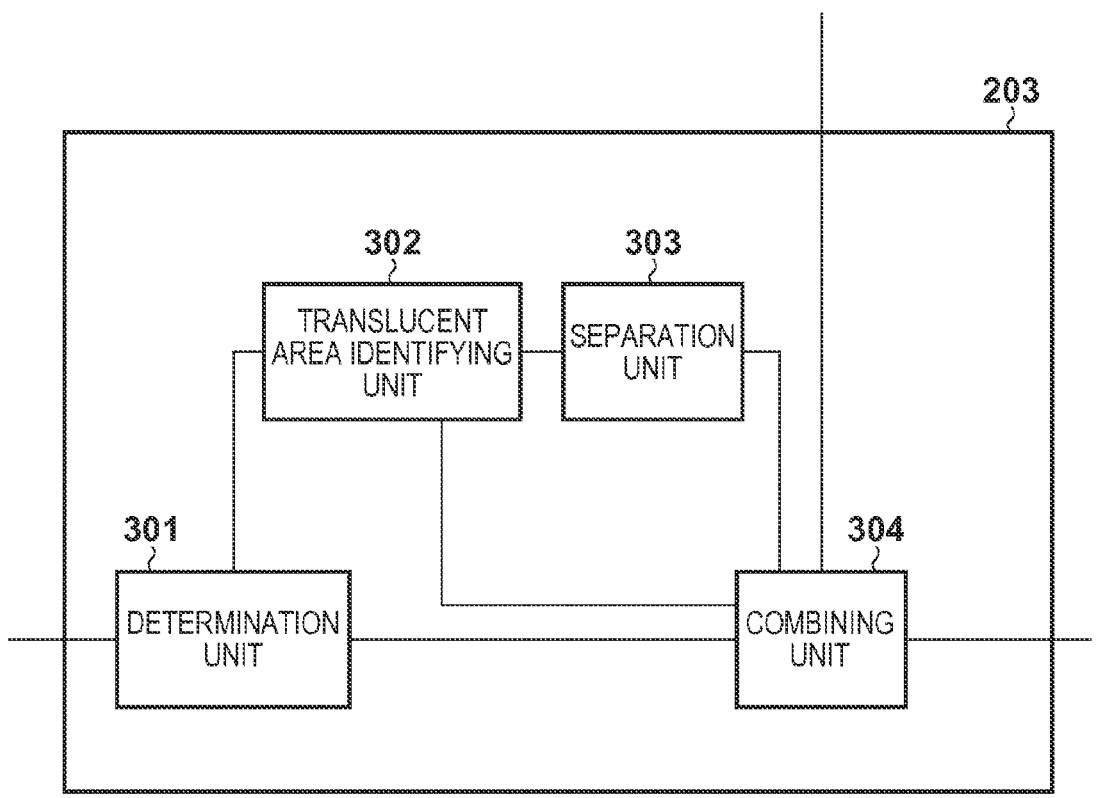
FIG. 3 is a block diagram showing an example of the functional arrangement of an image processing unit.

FIG. 3 is a block diagram for explaining the image processing unit 203 in detail. The image processing unit 203 is a function unit which combines a CG image received from the image processing apparatus 104 and an image captured by the image capturing unit 201, as described above. The image processing unit 203 includes, for example, a determination unit 301, translucent area identifying unit 302, separation unit 303, and combining unit 304.

The determination unit 301 determines whether or not an image received from the image processing apparatus 104 includes pixels of a predetermined background image, for example, blueback pixels. FIG. 4 shows an example of an image received from the image processing apparatus 104. In FIG. 4, reference numeral 401 denotes a pixel of a background image; 402, a CG pixel; and 403, a pixel which is obtained by translucently combining a CG and background image. The determination unit 301 outputs an area, which is determined not to include pixels of a background image, to the translucent area identifying unit 302, and an area, which is determined to include pixels of the background image, to the combining unit 304.

The translucent area identifying unit 302 determines whether each area (pixels) received from the determination unit 301 is a CG image or a translucent area. A determination method will be described later. The translucent area identifying unit 302 outputs an area (pixels) determined as a CG image to the combining unit 304, and an area (pixels) determined as a translucent area to the separation unit 303. The separation unit 303 separates a translucent area into a background and CG images before they are combined, and α value, that is, a coefficient indicating a transparency, and outputs the CG image and α value to the combining unit 304.

When an input area is a background area, the combining unit 304 replaces that area by an image read out from the captured image storage unit 207; when an input area is a CG image, the combining unit 304 outputs the CG image intact. Then, when an input area is a translucent area, the combining unit 304 translucently combines an image read out from the captured image storage unit 207 and the CG image separated by the separation unit 303 using α value, which is also separated by the separation unit 303. The combined image is sent to the display unit 204.

Prior to the description of processing in the translucent area identifying unit 302, a translucent image combining method will be briefly described. The translucent image combining processing is generally executed according to:

$$Z_{red} = X_{red} \times \alpha + Y_{red} \times (1-\alpha)$$

$$Z_{green} = X_{green} \times \alpha + Y_{green} \times (1-\alpha)$$

$$Z_{blue} = X_{blue} \times \alpha + Y_{blue} \times (1-\alpha)$$

where Z is a pixel value of an image after the translucent combining processing, X is a pixel value of the first image (a background image, for example, a captured image, blueback image, or specific pattern image), and Y is a pixel value of the second image (for example, a CG image). Note that when α=1, the first image is output; when α=0, the second image is output. That is, as the α value is smaller, pixel values of the second image have the stronger influence in a combined image; as the α value is larger, pixel values of the first image have the stronger influence in a combined image. By changing the α value between 0 to 1 in an image, the first and second images can be combined translucently or non-translucently. Also, suffices "red", "green", and "blue" indicate color information of red, green, and blue for each pixel. FIG. 5 shows translucent combining processing of a blueback image and CG image when α=0.5 for one pixel. When a pixel value of the blueback image is (R, G, B)=(0, 0, 255), and that of the CG image is, for example, (R, G, B)=(64, 192, 128), if they are combined using α=0.5, a translucently combined pixel value is (R, G, B)=(32, 96, 192). A pixel value of an image which is received from the image processing apparatus 104 by the HMD 101 is that of a translucently combined image of the blueback image and CG image. That is, in the example of FIG. 5, an image having a pixel value (R, G, B)=(32, 96, 192) is received.

(Translucent Area Determination Method)

A method of determining a translucent area or CG image area in the translucent area identifying unit 302 will be described below. In the example of FIG. 5, the pixel value of the image received from the image processing apparatus 104 is (R, G, B)=(32, 96, 192), as described above. In this case, when α=0.5 and a pixel value (R, G, B)=(64, 192, 128) of a CG image are obtained, it can be determined that this pixel is a translucent pixel. If the α value becomes 0, since a blueback image is not reflected to a translucent image according to the above equations, it can be determined that this pixel is a CG pixel.

Figure 6A:
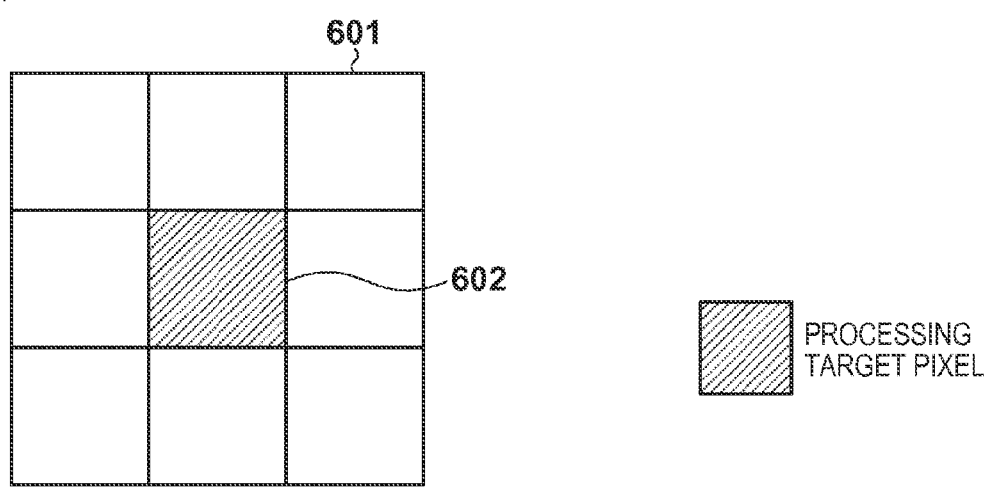
FIGS. 6A and 6B are views showing the relationship between a processing target pixel and surrounding pixels in determination of a translucent area.
Figure 6B:
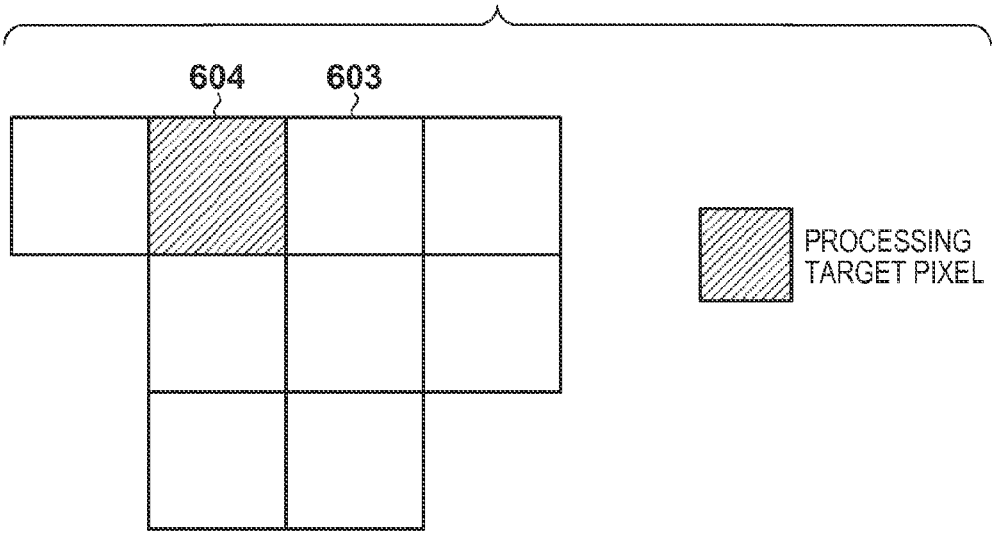

According to the above equations, for example, since the equation required to calculate "red" includes two indeterminate values (αvalue and $Y_{red}$), a pixel value of a CG image and α value cannot be calculated from information of one pixel. For this reason, the pixel value of the CG image is calculated and the α value is identified also using information of surrounding pixels. Between one pixel and surrounding pixels of this pixel, pixel values of the CG image and α values rarely largely change. For this reason, in this embodiment, a translucent area is separated using pixel information of a predetermined area including a processing target pixel and its surrounding pixels. In this embodiment, the following description will be given for a case in which eight surrounding pixels of a processing target pixel 602 are used as a predetermined area, as shown in FIG. 6A. However, the use range of surrounding pixels may be further broadened or narrowed down. Alternatively, as shown in, for example, FIG. 6B, of a predetermined number of surrounding pixels (for example, 24 pixels), those having smaller pixel value differences from the processing target pixel (for example, 8 pixels) may be used as the predetermined area in place of the eight surrounding pixels.

FIGS. 7A to 7F show a determination example of a translucent area when a CG image and background image are translucently combined using α=0.5. FIG. 7A shows pixel values of a CG image before translucent processing in a predetermined area including a processing target pixel, and FIG. 7B shows pixel values of a background image in that predetermined area. Note that a predetermined pattern image is used as the background image in place of a blueback image. FIG. 7C shows pixel values of a translucent area when the CG image and background image are translucently combined using α=0.5, that is, those of an image to be received from the image processing apparatus 104.

In this case, when a given first image (background image) and unknown second image (CG image) are to be separated from a translucent image, indeterminate values are an α value as a coefficient indicating a transparency and pixel values of the second image (CG image). However, if the unknown α value is assumed by one value, a pixel value of an image corresponding to the second image for that α value can be inversely calculated from the above equations. That is, one certain α value (0≤α<1) is assumed, and a pixel value of the CG image is inversely calculated by:

$$Y_{red} = \frac{Z_{red} - X_{red} \times \alpha}{(1 - \alpha)}$$

$$Y_{green} = \frac{Z_{green} - X_{green} \times \alpha}{(1 - \alpha)}$$

$$Y_{blue} = \frac{Z_{blue} - X_{blue} \times \alpha}{(1 - \alpha)}$$

where Y is a CG pixel value, Z is a pixel value of a combined image, and X is a pixel value of a background image. Note that since Y is indeterminate when α=1, CG pixel value calculations using these equations are skipped.

FIG. 7D shows CG pixel values in the predetermined area, which are calculated from the received image when the α value=0.7 is assumed, and a total of differences between the processing target pixel and surrounding pixels calculated based on the CG pixel value. That is, FIG. 7D shows calculation results of CG pixel values Y respectively for R, G, and B by the above equations under the assumption of α=0.7, and an accumulation result of differences between the surrounding pixels and processing target pixel in association with the calculated CG pixel values. Likewise, FIG. 7E shows an example when α=0.5, and FIG. 7F shows an example when α=0.3. Note that although not shown in FIGS. 7D to 7F, CG pixel values and totals of difference values based on the CG pixel values are also calculated for cases in which the α value assumes 0.1 to 0.2, 0.4, 0.6, and 0.8 to 0.9. That is, using the α value as a parameter, for a plurality of parameters, CG pixel values in the predetermined area are inversely calculated and accumulated values of differences between the CG pixel value of the processing target pixel and those of other pixels included in the predetermined area are calculated. Also, the α value may be changed in finer steps such as 0.01 increments in place of 0.1 increments, or in wider steps such as 0.125 increments. Furthermore, difference calculations may also be made for the α value=0. Note that the total of difference values is calculated based on:

Total=Σ|target pixel value$_{red}$-surrounding pixel value$_{red}$|+Σ|target pixel value$_{green}$-surrounding pixel value$_{green}$|+Σ|target pixel value$_{blue}$-surrounding pixel value$_{blue}$|

Since CG pixel values rarely largely change between neighboring pixels, when a total of differences between CG pixel values of processing target pixel and surrounding pixels, which are calculated for a certain α value, is small, it can be determined that the target pixel is translucently combined using that α value. That is, when CG pixel values, which are inversely calculated using a certain α value, roughly coincide with each other between the processing target pixel and surrounding pixels, it can be determined that the target pixel is that which is translucently combined using that α value. Therefore, the separation unit 303 calculates an α value which minimizes a total of differences, and temporarily stores that α value. Note that in the examples shown in FIGS. 7D to 7F, in case of FIG. 7E, that is, when the α value is 0.5, the total of differences between the target pixel and surrounding pixels is smallest. For this reason, the separation unit 303 estimates that the background image and CG image are combined using α=0.5, and temporarily stores the α value=0.5. Note that this embodiment assumes the α value which minimizes the total of differences as that used in the translucent combining processing, but the present invention is not limited to this. For example, α values corresponding to totals of differences, which are smaller than a predetermined value, may be calculated, and minimum or maximum one of these α values may be assumed as that used in the translucent combining processing. Also, when the total of differences is smaller than a predetermined value within a certain α value range, an α value as the median of the range may be assumed as that used in the translucent combining processing. Furthermore, by calculating a weighted average based on α values and total values of differences, an α value used in the translucent combining processing may be assumed.

In this case, when α is sufficiently small, a pixel value of a translucent image is mostly composed of a CG pixel value before the translucent combining processing. Therefore, in this embodiment, the separation unit 303 determines that the target pixel is not that in a translucent area but a CG pixel when the α value is not more than a predetermined value. For example, when the α value is not more than 0.1, the separation unit 303 determines that the target pixel is not that in a translucent area. Note that the predetermined value used to determine whether or not the target pixel is included in a translucent area may be other than 0.1. For example, when difference values are to be calculated for α values in 0.01 increments, it may be judged that the target pixel is that of a CG image when the α value is not more than 0.09. In this manner, the predetermined value may be determined according to steps of α values used to calculate difference values.

This predetermined value may be variable depending on the situation. For example, when an average of α values temporarily stored by the separation unit 303 is low for a certain area of a received image, the predetermined value may be lowered to easily detect a translucent area, thereby detecting translucent areas combined using lower α values without any omission. Likewise, for non-translucent areas included as spots in an area determined as a translucent area, the predetermined value may be lowered to execute the translucent area determination again. Thus, pixels which are erroneously determined as those in a CG area in a large translucent area can be included in the translucent area at a higher probability. Also, when a certain area of a received image includes a large number of spot areas determined as translucent areas, the predetermined value may be increased to prevent areas which are originally not translucent areas from being erroneously determined as translucent areas.

In the above description, the processing for one pixel has been explained using FIGS. 7A to 7F, and this processing is executed for all areas which are not the background area.

(Image Combining Processing)

Figure 8:
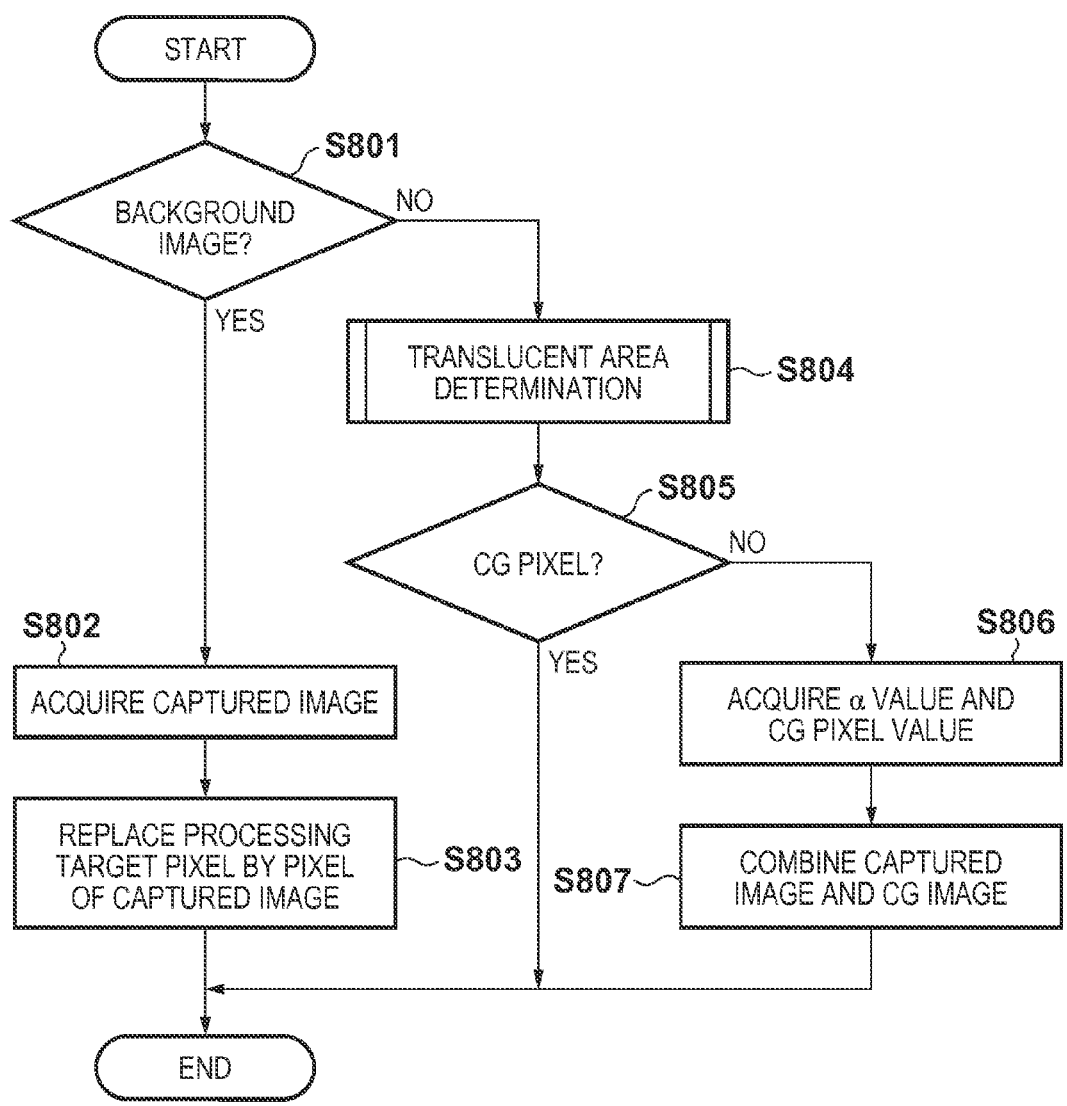
FIG. 8 is a flowchart showing combining processing of a received image and captured image.

FIG. 8 is a flowchart showing the overall processing for combining an acquired received image (a CG image or translucent image) received from the image processing apparatus 104 and a captured image in this embodiment. When the processing is started, the determination unit 301 determines whether or not a pixel of the image received from the image processing apparatus 104 is included in a given background image (for example, a blueback image) (step S801). More specifically, the determination unit 301 determines whether or not a pixel value of a given background image coincides with that of the received image in association with the processing target pixel, and if they coincide with each other, the determination unit 301 determines that the pixel is that of the background image. If the determination unit 301 determines that the processing target pixel is that of the background image (Yes in step S801), the combining unit 304 acquires the captured image from the captured image storage unit 207 (step S802), and replaces the background image by the captured image for that pixel (step S803), thus ending the processing. If the determination unit 301 determines that the processing target pixel is not that of the background image (No in step S801), the translucent area identifying unit 302 determines whether the processing target pixel is a CG pixel or translucent pixel (steps S804 and S805). That is, when the processing target pixel coincides with that of the background pixel, the translucent area identifying processing is skipped; only when it does not coincide with a pixel of the background pixel, the translucent area identifying processing is executed. The sequence of this determination processing will be described later.

If the translucent area identifying unit 302 determines that the processing target pixel is a CG pixel (Yes in step S805), since the CG pixel is displayed intact, the processing ends without any placing or combining processing. If the translucent area identifying unit 302 determines that the processing target pixel is a translucent pixel (No in step S805), it executes decision of a pixel value (a CG pixel value before the translucent combining processing) of a combination target image and an α value (step S806). Then, the combining unit 304 combines the CG image and captured image using the pixel value of the combination target image and α value calculated in step S806 and the captured image acquired from the captured image storage unit 207 (step S807).

(Translucent Area Determination Processing)

Figure 9:
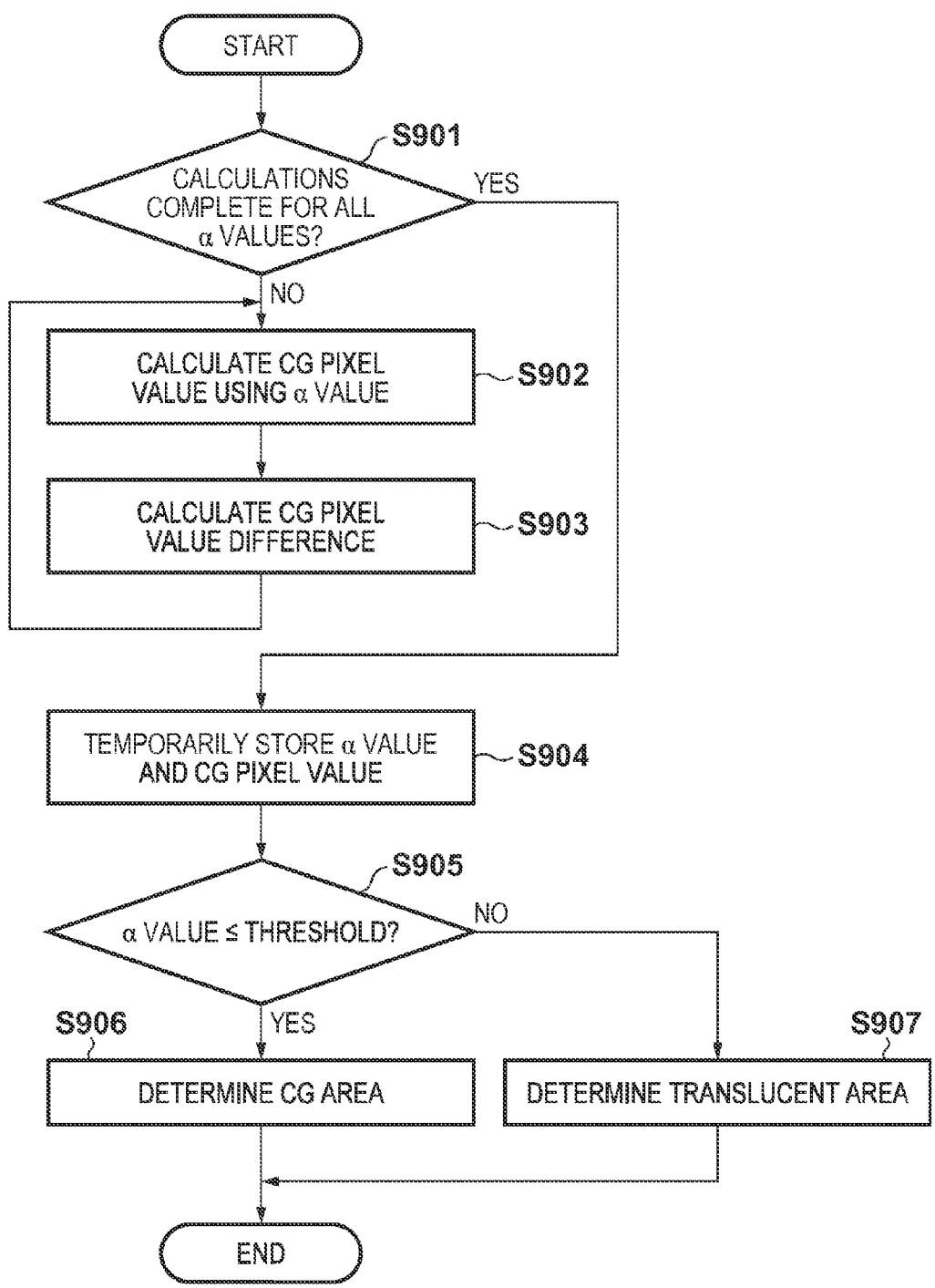
FIG. 9 is a flowchart showing details of the translucent area determination processing.

FIG. 9 is a flowchart showing details of the translucent area determination processing in step S804 of FIG. 8. This processing is executed by the translucent area identifying unit 302. When the processing is started, the translucent area identifying unit 302 determines whether or not calculations of CG pixel values and those of differences, as shown in FIGS. 7D to 7F, are complete for all α values as calculation targets (step S901). If α values for which the calculations are not complete yet still remain (No in step S901), the translucent area identifying unit 302 executes calculations of CG pixel values (step S902) and those of an accumulated value of differences of CG pixel values (step S903) in association with the processing target pixel and surrounding pixels for an α value as a calculation target, as shown in FIGS. 7D to 7F.

If the calculations of CG pixel values and differences are complete for all the α values as calculation targets (Yes in step S901), the translucent area identifying unit 302 identifies an α value and CG pixel value when the difference value calculated in step S903 is smallest, and temporarily stores them (step S904). Then, the translucent area identifying unit 302 determines whether or not the temporarily stored α value is not more than a threshold (step S905). If the α value is not more than the threshold (Yes in step S905), the translucent area identifying unit 302 determines that the processing target pixel value is a CG pixel value (step S906); otherwise (No in step S905), it determines that the processing target pixel value is a translucent pixel value (step S907).

Note that in the above description, the translucent area identifying unit 302 decides a pixel value of the combination target image and α value in step S806 of FIG. 8. Alternatively, the translucent area identifying unit 302 may execute processing for merely reading out the α value and CG pixel value temporarily stored in step S904. However, the α value and CG pixel value temporarily stored in step S904 need not always be used. For example, in an area determined as a translucent area, an average value of α values in surrounding translucent pixels including the processing target pixel may be used as an α value for the processing target pixel. Also, a CG pixel value, which can be calculated using that α value, may be used as that of the processing target pixel. In this manner, the α value and CG pixel value temporarily stored in step S904 may be used intact or a separately identified α value and CG pixel value may be used to combine images.

As described above, according to this embodiment, in association with an image which is translucently combined with a background image, a translucent area and CG area can be discriminated to separate an image before combination without receiving any α value or special data and without embedding information in an image. Therefore, an image including a translucent area can be transmitted to the HMD without deteriorating the quality of a CG image, and a high-resolution CG image and captured image can be translucently combined.

Second Embodiment

The first embodiment has explained the method in which the image processing apparatus 104 transmits an image obtained by rendering a CG on a background image to the HMD 101, and the HMD 101 combines a captured image and the received image to generate a display image. This embodiment will explain a method of changing superimposing processing depending on an output destination when the HMD 101 executes combining processing.

(Arrangement of System)

Figure 10:
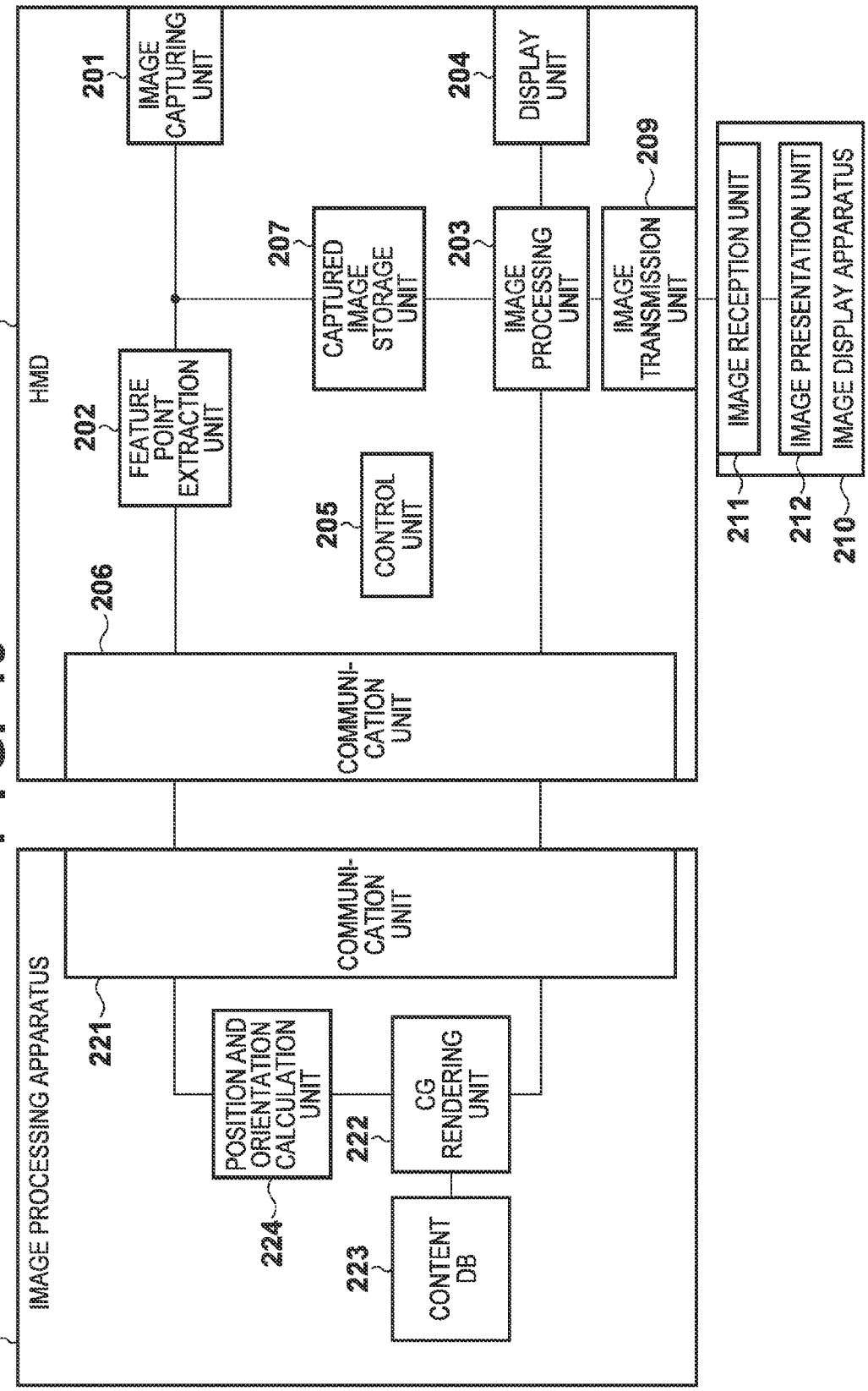
FIG. 10 is a block diagram showing an example of the functional arrangement of an image processing apparatus, HMD, and image display apparatus according to the second embodiment.

FIG. 10 is a block diagram showing the functional arrangement of an image processing apparatus 104, HMD 101, and image display apparatus 210, which are included in an image processing system of this embodiment. In the image processing system of this embodiment, for example, an image transmission unit 209 is added to the HMD 101, and the image display apparatus 210 connected to the image transmission unit 209 is added in the arrangement of the first embodiment. Note that FIG. 10 shows one image display apparatus 210 as an external display apparatus. However, the number of external display apparatuses is not limited to only one, and a plurality of display apparatuses may be connected.

The image display apparatus 210 is a display apparatus which allows a user who does not wear any HMD to view an image displayed on the HMD. Thus, the user who does not wear the HMD can view the same image as that of the HMD user. The image transmission unit 209 of the HMD 101 acquires an image from an image processing unit 203, and transmits this image to the image display apparatus 210. An image reception unit 211 of the image display apparatus 210 receives the image from the HMD 101, and sends this image to an image presentation unit 212. The image presentation unit 212 displays the received image. In this manner, the external display apparatus can display an image.

(Arrangement of Image Processing Unit)

FIG. 11 is a block diagram showing an example of the detailed arrangement of the image processing unit 203 of this embodiment. The image processing unit 203 additionally includes, for example, an external display combining unit 310 compared to the arrangement of the first embodiment. The external display combining unit 310 is a function unit which generates an image to be displayed on the image display apparatus 210.

Figure 12A:
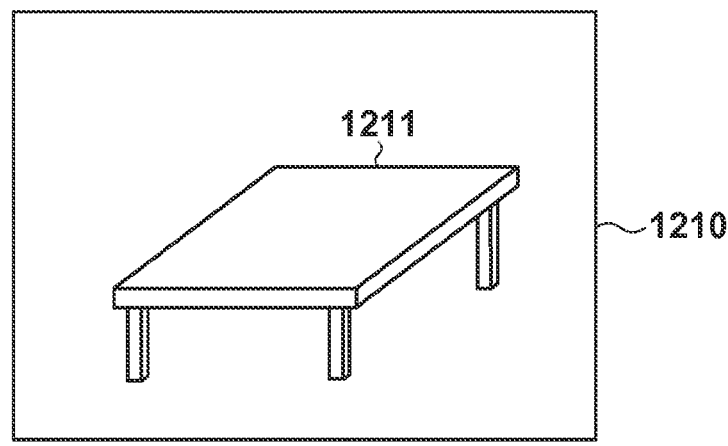
FIGS. 12A to 12F are views showing examples of a captured image, received image, and a combined image of the first embodiment, and those of images combined in various modes.
Figure 12B:
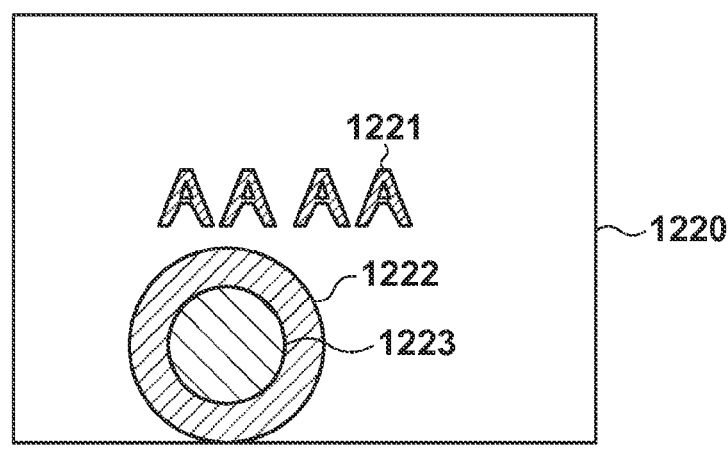
Figure 12C:
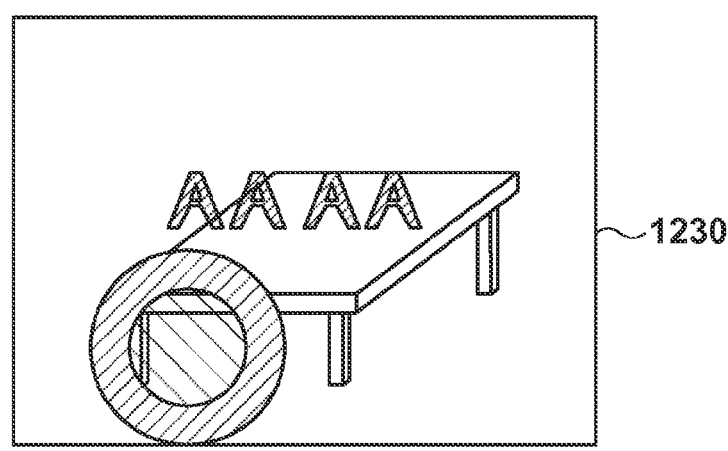

FIGS. 12A to 12F show examples of an image received from the image processing apparatus 104 by the HMD 101, an image to be displayed on a display unit 204 by the HMD 101, and an image to be transmitted from the HMD 101 to the image display apparatus 210. FIG. 12A shows an image captured by an image capturing unit 201, and FIG. 12B shows a CG image including a translucent area, which is received from the image processing apparatus 104. Text information 1221 and an area 1223 in FIG. 12B indicate translucent areas, and an area 1222 indicates a non-translucent CG area. In FIG. 12B, the text information is translucent, but a translucent target is not limited to the text information, but may be a symbol or object. The HMD 101 of the first embodiment combines a captured image and the received image, and displays the combined image on the display unit 204, as shown in FIG. 12C.

Figure 12D:
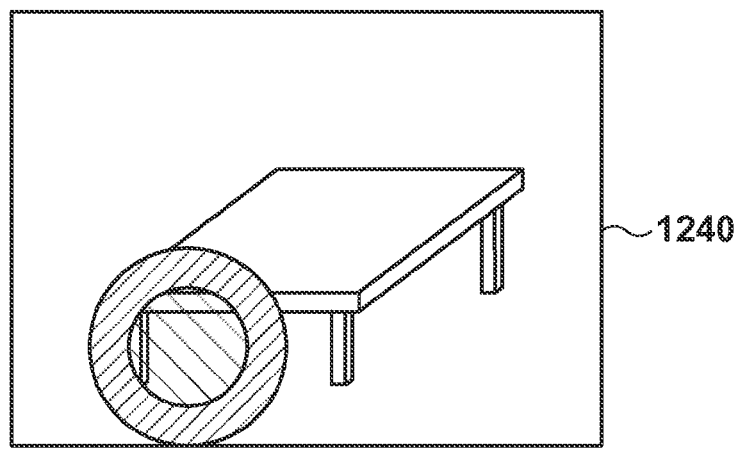
Figure 12E:
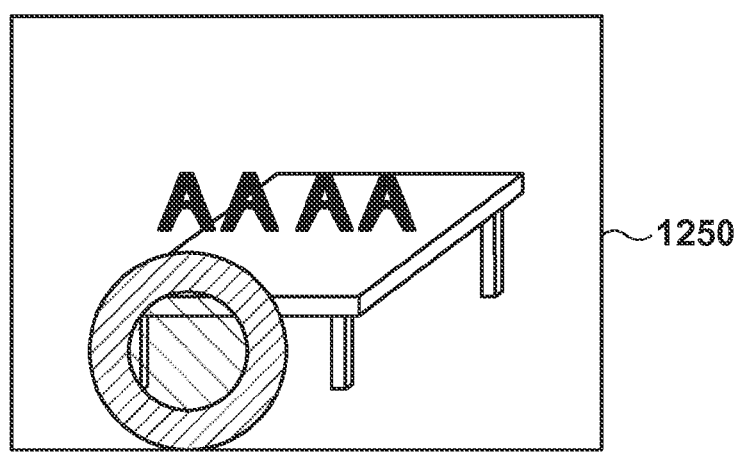
Figure 12F:
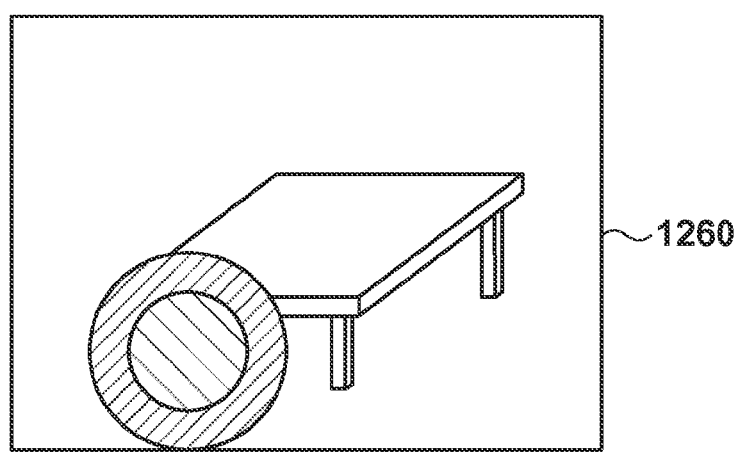

FIG. 12D shows an example in which the translucent text information is not combined, FIG. 12E shows an example in which the translucent text information is combined as non-translucent text information, and FIG. 12F shows an example in which a translucent CG is combined as a non-translucent CG without combining any translucent text information. Note that FIG. 12E shows the example in which the translucent text information is combined as non-translucent text information. However, in translucent processing, an α value as a coefficient indicating a transparency may be changed. By changing the α value, a CG image having a higher transparency can be combined with the captured image, or a non-translucent or nearly non-translucent translucent CG image can be combined with the captured image. For example, when the text information is to be clearly presented to the HMD user, the image as shown in FIG. 12E is displayed on the display unit 204; when the text information is not to be presented to the image display apparatus 210, the image as shown in FIG. 12D may be output from the image transmission unit 209. When a CG image does not include any non-translucent pixels around a translucent pixel, display control of some pieces of information can be attained by such use method. Also, a non-background area including a translucent area may not be fully displayed on, for example, the image display apparatus 210. When a translucent area is not to be displayed on the external display apparatus, an image as shown in FIG. 12F may be displayed. In this manner, the images shown in FIGS. 12C to 12F are selectively displayed on the display unit 204 and image display apparatus 210 according to the use purpose and use environment.

The following description will be given under the assumption that the image shown in FIG. 12C is displayed on the display unit 204 of the HMD 101, and the image shown in FIG. 12F is presented by the image presentation unit 212 of the image display apparatus 210. However, the present invention is not limited to this, and combinations of any of FIGS. 12C to 12F may be displayed. The same image may be displayed on the display unit 204 and the image presentation unit 212. Combining methods to be used and display units used to display images may be fixedly set in the HMD 101, or may be set in accordance with an instruction from the image processing apparatus 104. For example, combined images and display units used to display these images may be dynamically switched during an image display operation in accordance with an instruction from the image processing apparatus 104 or that from a user interface (not shown) connected to the HMD 101.

Figure 13:
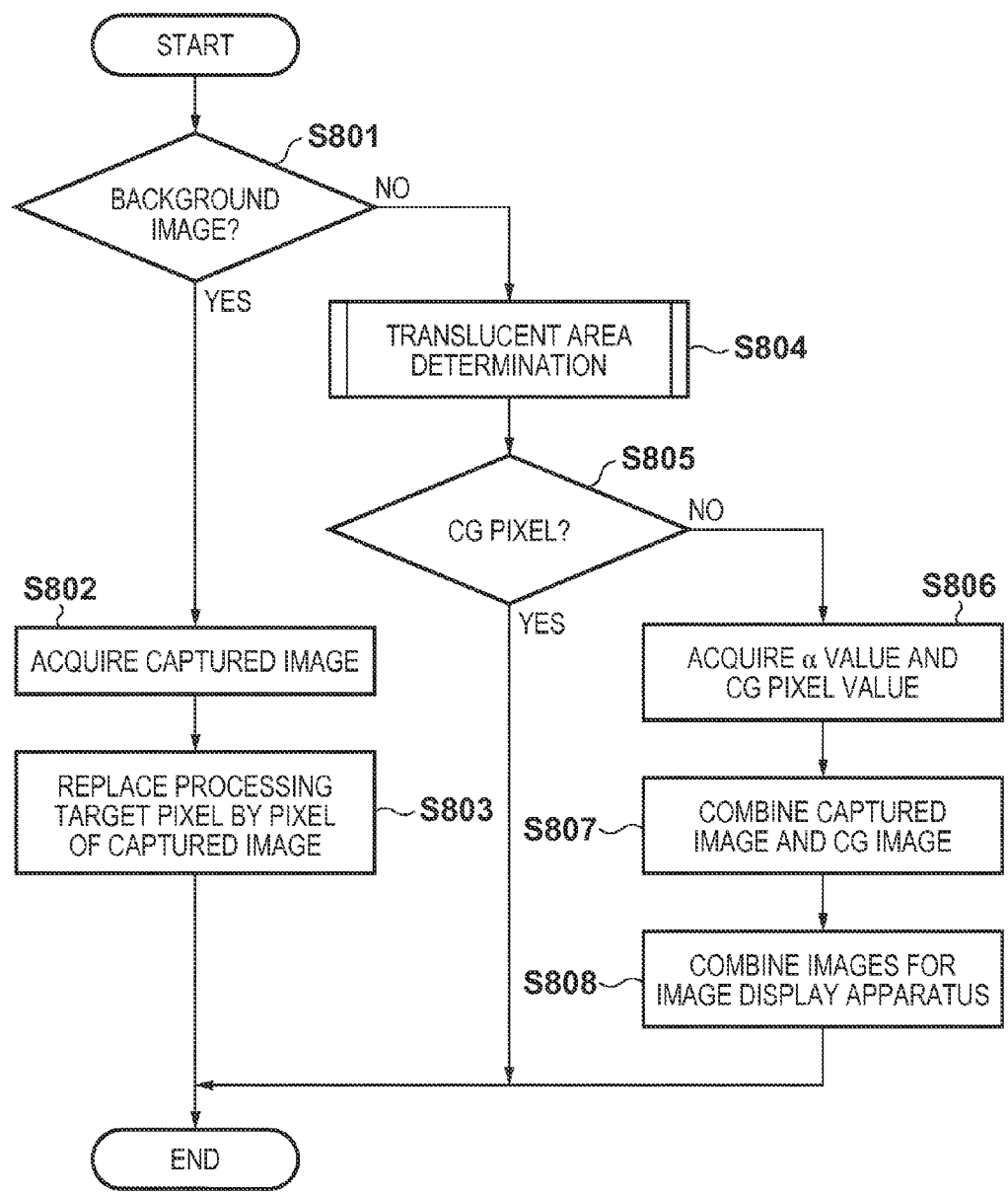
FIG. 13 is a flowchart showing combining processing of a received image and captured image according to the second embodiment.

FIG. 13 is a flowchart showing combining processing of images to be displayed on the respective display units in this embodiment. In the flowchart shown in FIG. 13, processing of step S808 is added to that shown in FIG. 8. A description of the processing other than that of step S808 will not be repeated. In step S808, the external display combining unit 310 receives images from a separation unit 303, determination unit 301, and captured image storage unit 207, and combines an image to be passed to the image display apparatus 210. Note that the external display combining unit 310 receives a CG pixel value and α value from the determination unit 301. For this reason, the external display combining unit 310 can combine an image for the image display apparatus in a mode different from that of the display unit 204.

According to this embodiment, the image combining methods can be changed according to the display units used to display images, and images suited to the respective display units can be displayed.

Note that in the above description, the HMD 101 is used. However, the present invention is not limited to this, and any type of image display apparatuses which display an image obtained by combining an image received from the image processing apparatus 104 and a captured image can be used.

Third Embodiment

In the example described in the aforementioned embodiment, the HMD 101 detects a position and orientation, notifies the information processing apparatus 104 of the position and orientation, receives a CG image according to the position and orientation from the information processing apparatus 104, and displays an image by combing a captured image and the CG image. This embodiment will explain an example in which the information processing apparatus 104 calculates a position and orientation of the HMD 101 from a video captured by the camera of the HMD 101, generates a superimposed image obtained by superimposing a CG image on a captured image, and transmits the superimposed image to the HMD 101.

In this case, a communication of a captured image and superimposed image is made between the information processing apparatus 104 and HMD 101. In this communication, a communication volume is often required to be reduced as much as possible. For this purpose, the HMD 101 may transmit a captured image having a minimum required resolution, for example, a resolution half that upon image capturing, which is required for position and orientation calculations, to the information processing apparatus 104. Since the information processing apparatus 104 has to generate an MR image to have a size displayed on the HMD 101, it enlarges the captured image received from the HMD 101, and then superimpose a CG image on the enlarged image. Since the captured image is enlarged in this manner, an area of an image to be translucently combined with the captured image has a lower resolution than the CG image.

Therefore, in this case, the HMD 101 may replace an area to be translucently combined with the captured image by a captured image of a higher resolution. At this time, in order to replace that area by the captured image of the higher resolution, transparency information (α value) used in the translucent combining processing is required. At this time, when the technique described in Japanese Patent Laid-Open No. 2005-107780 is used, since the α value is embedded in data of an image, color information of the image is reduced compared to that before the α value is embedded. Therefore, this embodiment will explain a method which allows obtaining of an image obtained by combining a captured image and CG image at a high resolution.

(Arrangement of System)

The arrangement of a system of this embodiment is the same as that of the first or second embodiment, and a detailed description thereof will not be repeated.

(Arrangement of Apparatuses in System)

Figure 14:
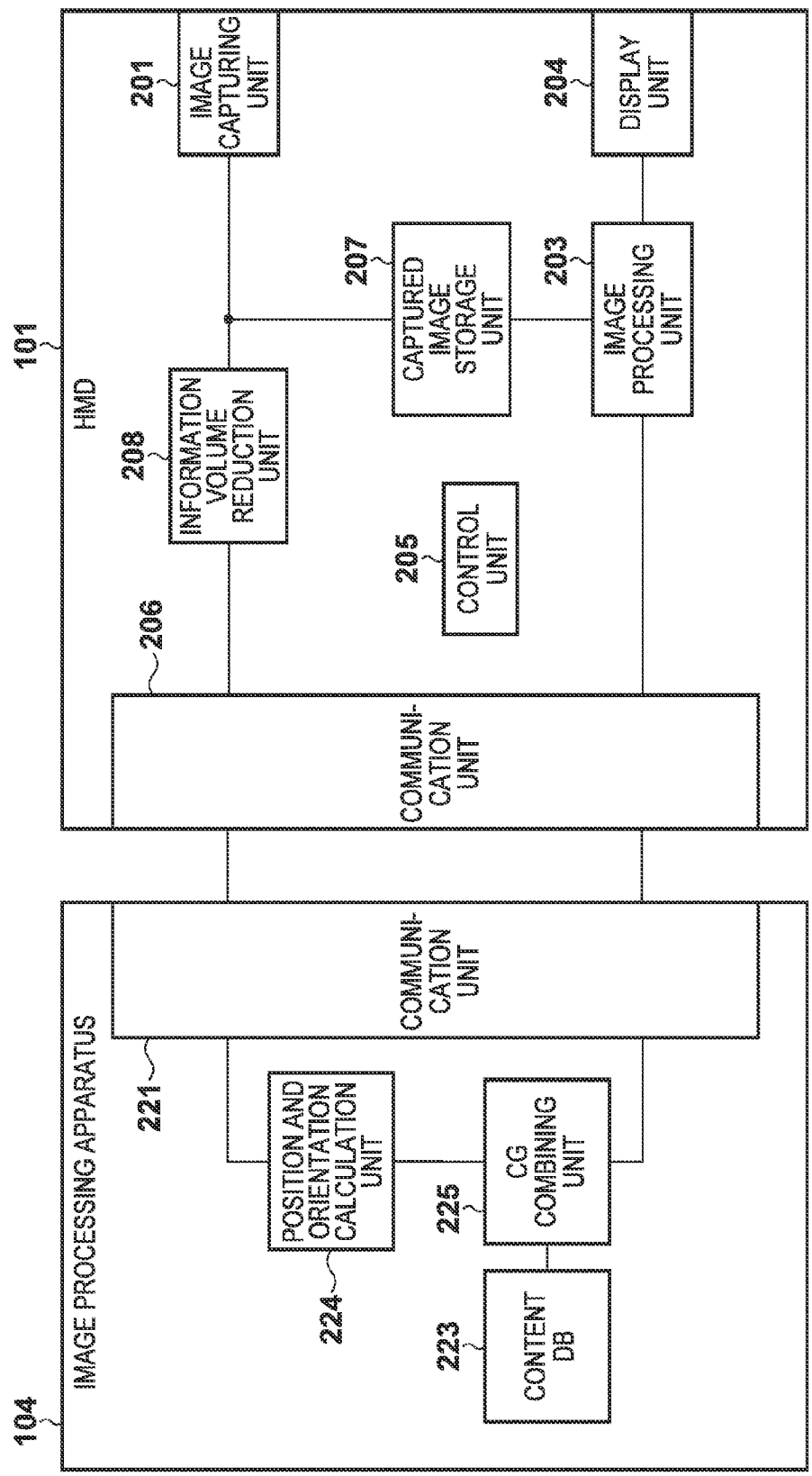
FIG. 14 is a block diagram showing an example of the arrangement of an HMD and image processing apparatus according to the third embodiment.

FIG. 14 is a block diagram showing an example of the arrangement of an HMD 101 and image processing apparatus 104 in the image display system shown in FIG. 1.

As in the first or second embodiment, the HMD 101 includes an image capturing unit 201, image processing unit 203, display unit 204, control unit 205, communication unit 206, and captured image storage unit 207. In this embodiment, the HMD 101 further includes an information volume reduction unit 208. The information volume reduction unit 208 reduces information of an image captured by the image capturing unit 201. Note that the HMD 101 may include other function units (not shown).

As in the first or second embodiment, the image processing apparatus 104 includes a communication unit 221, content DB 223, and position and orientation calculation unit 224. Also, the image processing apparatus 104 further includes a CG combining unit 225 which combines an image stored in the content DB 223 and that received from the HMD 101. Note that in this embodiment, the position and orientation calculation unit 224 calculates a position and orientation of the HMD 101 from an image received from the HMD 101. Also, the image processing apparatus 104 may include other function units (not shown).

In this embodiment, in the aforementioned arrangement, a captured image of an external world captured by the image capturing unit 201 of the HMD 101 is sent to the image processing apparatus 104 via the communication unit 206. The position and orientation calculation unit 224 of the image processing apparatus 104 calculates the position and orientation of the HMD 101 from the received captured image. The CG combining unit 225 combines a CG image on the captured image based on the position and orientation of the HMD 101 calculated by the position and orientation calculation unit 224. After that, the combined image is transmitted to the HMD 101 via the communication unit 221. The HMD 101 displays the combined image received from the image processing apparatus 104 on the display unit 204. With the aforementioned arrangement, the user can view an image combined by the image processing apparatus 104 by wearing the HMD 101.

In this embodiment, in order to reduce a communication volume between the HMD 101 and image processing apparatus 104, the information volume reduction unit 208 reduces an information volume of the captured image to be transmitted from the HMD 101 to the image processing apparatus 104. For example, the information volume reduction unit 208 halves a resolution of an image captured by the image capturing unit 201 or reduces color information. This embodiment will explain an example using a method of halving vertical and horizontal sizes of a captured image.

The CG combining unit 225 of the image processing apparatus 104 enlarges the captured image to a size that can be displayed on the display unit 204 before it combines a CG image. For example, when the size of an image captured by the image capturing unit 201 is the same as that of an image to be displayed on the display unit 204, since the information volume reduction unit 208 halves the vertical and horizontal sizes of the captured image, the CG combining unit 225 doubles the vertical and horizontal sizes of the captured image before it combines a CG image. Since the captured image is halved once and is then doubled, a captured image area and an area translucently combined with a CG image in a combined image have a lower apparent resolution than the CG image.

Figure 15:
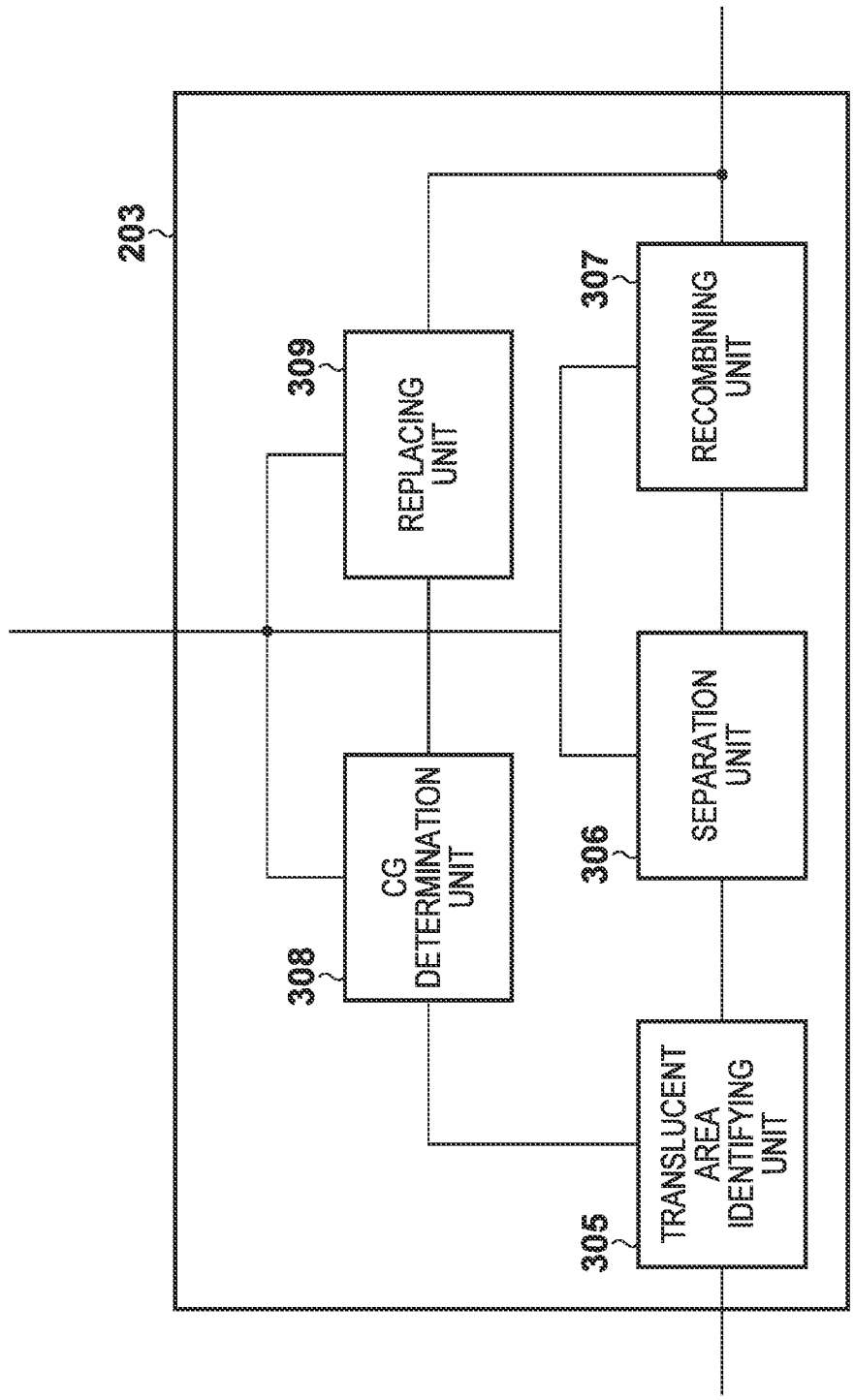
FIG. 15 is a block diagram showing an example of the detailed arrangement of an image processing unit of the HMD shown in FIG. 14 in the third embodiment.

FIG. 15 is a block diagram showing an example of the detailed arrangement of the image processing unit 203. The image processing unit 203 replaces data of a captured image and a translucent area having a lower apparent resolution than a CG image by high-resolution image data.

In FIG. 15, a translucent area identifying unit 305 determines a translucently combined area from an image received from the image processing apparatus 104.

Figure 16:
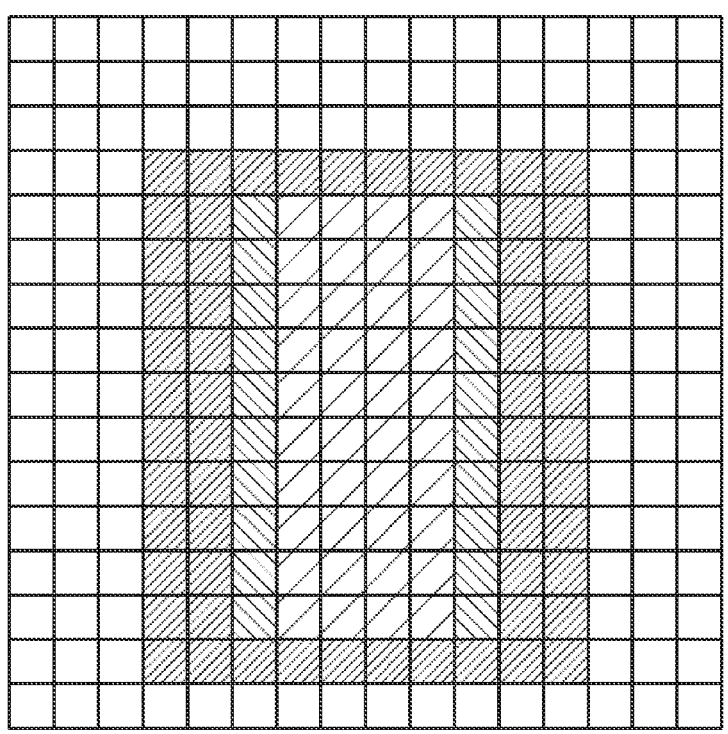
FIG. 16 is a schematic view showing an example of a combined image received from the image processing apparatus in the third embodiment.

FIG. 16 is a schematic view showing an example of a combined image received from the image processing apparatus 104.

In FIG. 16, an area 404 indicates that of a captured image. An area 405 indicates an area of a CG image, and an area 407 indicates a translucently combined area. In this embodiment, areas 406 of pixels indicating borders are included adjacent to the translucent area 407, and it is assumed that these pixels have a color which is not used except for the borders of the translucent area 407. In this embodiment, a translucent area is determined using information indicating a translucently combined area, as shown in FIG. 16. However, the present invention is not limited to this.

Information of an area determined as a translucent area by the translucent area identifying unit 305 is sent to a separation unit 306, and information of an area determined as that other than a translucent area is sent to a CG determination unit 308. When information of a combined image is sent from the translucent area identifying unit 305 to the separation unit 306 or CG determination unit 308, pixels which indicate borders of the translucent area are replaced based on surrounding pixels. As this replacing method, these pixels may be replaced by neighboring pixels or by an average value of surrounding pixels.

The CG determination unit 308 determines whether an image received from the translucent area identifying unit 305 is an area of the captured image or CG image. Since an original captured image is stored in the captured image storage unit 207, the captured image stored in the captured image storage unit 207 and the combined image received from the image processing apparatus 104 are compared for each pixel. When this comparison result indicates that two pixels are similar, it is determined that the pixel is included in an area of the captured image, and a replacing unit 309 replaces that pixel by that of the captured image stored in the captured image storage unit 207. In this manner, the area of the captured image is replaced by a high-resolution image.

Whether or not a combined image received from the image processing apparatus 104 is similar to a captured image stored in the captured image storage unit 207 is determined by, for example, the following method. The HMD 101 acquires an enlargement method (for example, bilinear or bicubic) of the captured image from the image processing apparatus 104 in advance. For this reason, the HMD 101 can predict a pixel value after the captured image is enlarged, and can determine whether or not the combined image and captured image are similar to each other.

The separation unit 306 separates the translucently combined area into a CG image and captured image before combination, and calculates a transparency ($\alpha$ value) used upon translucently combining these images. The separation processing to a CG image and captured image by the separation unit 306 and the calculation processing of an $\alpha$ value are executed in the same manner as in the description of the first embodiment. Note that a background image in the description of the first embodiment is the captured image in this embodiment. After that, a recombining unit 307 translucently combines images using a high-resolution captured image stored in the captured image storage unit 207 based on the obtained pixel values of the CG image and $\alpha$ value.

Figure 17:
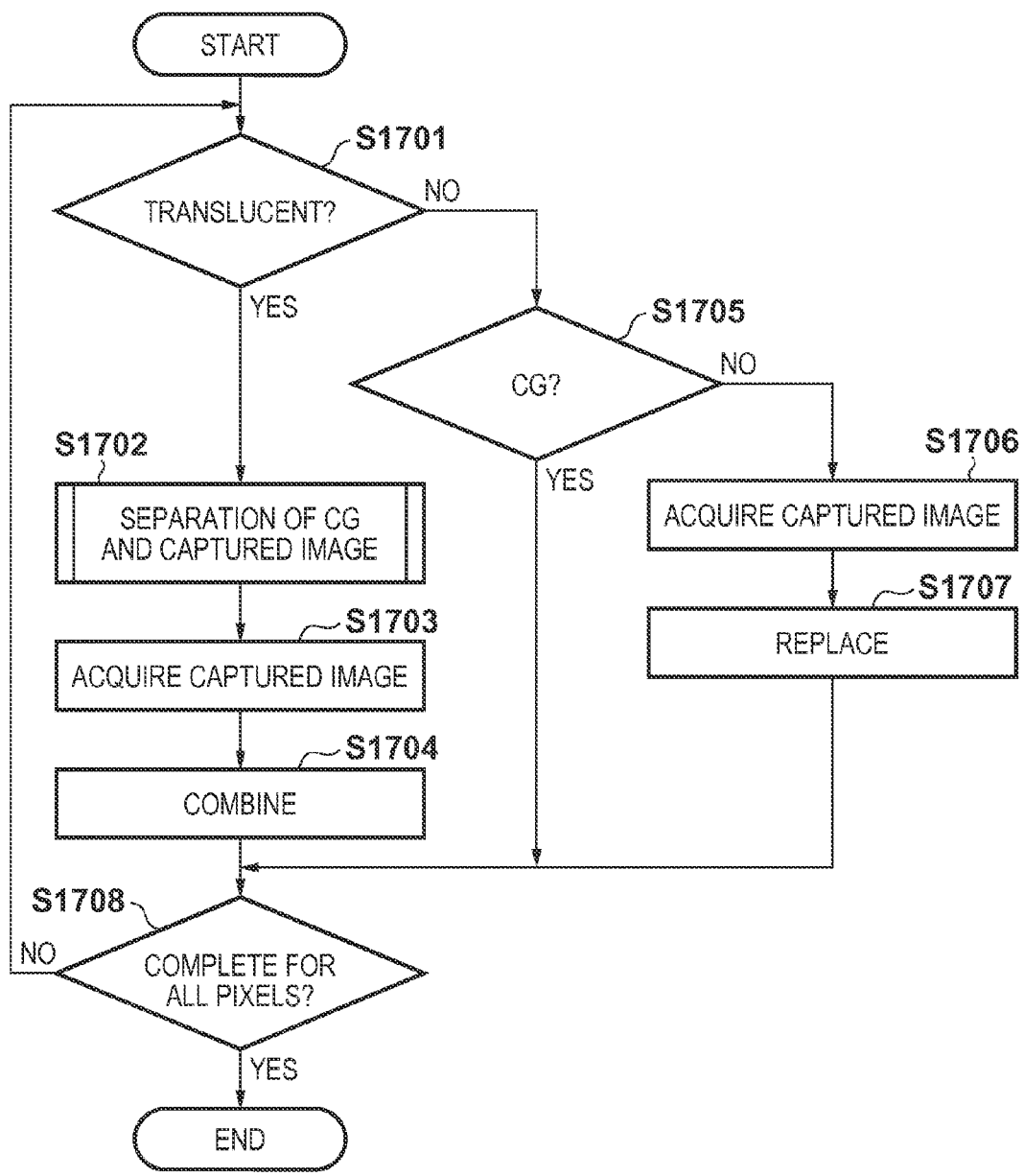
FIG. 17 is a flowchart showing an example of the processing sequence for replacing an area of a captured image and a translucent area at a high resolution in the third embodiment.

FIG. 17 is a flowchart showing an example of the processing sequence for replacing an area of a captured image and translucent area by a high resolution image by the image processing unit 203 in this embodiment.

The translucent area identifying unit 305 determines in step S1701 whether or not a pixel of the combined image received from the image processing apparatus 104 is translucent. As a result of this determination, if that pixel is translucent, the separation unit 306 separates the combined image into a captured image and CG image before combination in step S1702. Note that details of this processing will be described later.

Next, in step S1703, the recombining unit 307 acquires a corresponding pixel of the captured image from the captured image storage unit 207. Then, in step S1704, the recombining unit 307 recombines the CG image separated in step S1702 and the captured image acquired in step S1703 using the $\alpha$ value.

On the other hand, as a result of determination in step S1701, if the pixel is not translucent, the CG determination unit 308 determines in step S1705 whether or not the pixel belongs to a CG image area or captured image area. As a result of this determination, if the pixel belongs to a CG image area, the process advances to step S1708; if it belongs to a captured image area, the replacing unit 309 acquires a corresponding pixel of the captured image from the captured image storage unit 207 in step S1706. Then, in step S1707, the replacing unit 309 replaces the pixel by that of the captured image acquired in step S1706. The image processing unit 203 then determines in step S1708 whether or not the processing is complete for all pixels. As a result of this determination, if pixels to be processed still remain, the process returns to step S1701; otherwise, the processing ends.

Figure 18:
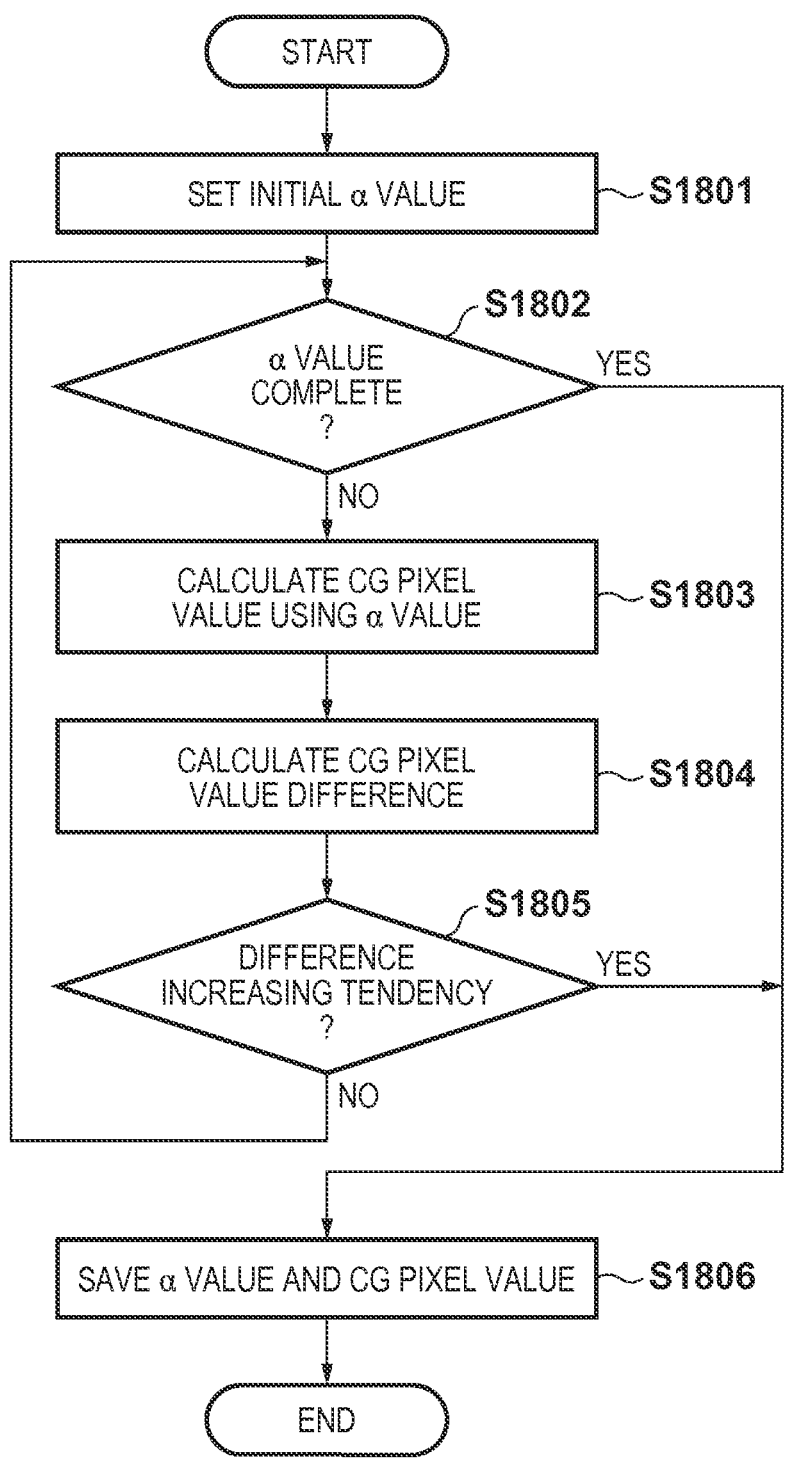
FIG. 18 is a flowchart showing an example of the detailed processing sequence of step S1702 of FIG. 17 in the third embodiment.

FIG. 18 is a flowchart showing an example of the detailed processing sequence executed by the separation unit 306 in step S1702 of FIG. 17. Note that in this embodiment, the separation unit 306 executes processing according to the sequence shown in FIG. 18, but it may execute processing according to the sequence shown in FIG. 9.

In step S1801, the separation unit 306 sets an initial $\alpha$ value. The initial $\alpha$ value to be set may assume a fixed value or an already calculated $\alpha$ value of surrounding pixels. In this embodiment, an average of already calculated $\alpha$ values of surrounding pixels is set as an initial value. Since the $\alpha$ value rarely largely changes between neighboring pixels, a calculation volume required to calculate an $\alpha$ value and a pixel value of a CG image can be reduced by setting the $\alpha$ value of surrounding pixels as an initial value.

Next, the separation unit 306 determines in step S1802 whether or not processing for changing an $\alpha$ value within possible values is complete. As a result of this determination, if calculations for all possible values of the $\alpha$ value are not complete yet, the process advances to step S1803. In step S1803, the separation unit 306 calculates pixel values of a CG image for a target pixel and eight surrounding pixels using the $\alpha$ value, as shown in FIGS. 7D to 7F.

In step S1804, the separation unit 306 calculates differences of calculated pixel values between the target pixel and surrounding pixels. Then, the separation unit 306 determines in step S1805 whether or not the difference between the pixel values of the target pixel and surrounding pixels have an increasing tendency. As a result of this determination, if the differences have an increasing tendency even when the α value is changed any more, the process advances to step S1806. Then, in step S1806, the separation unit 306 determines that an α value and a pixel value of the CG image when the total of the differences between the pixel values of the target pixel and surrounding pixel, which are calculated in step S1804, is smallest are the pixel value of the CG image before combination by the image processing apparatus 104 and the α value used, and saves these values. On the other hand, as a result of the determination in step S1805, if the differences have a decreasing tendency, the process returns to step S1802.

As described above, according to this embodiment, the need for receiving information of an α value from the image processing apparatus in association with a translucently combined area can be obviated, and images before combination can be separated. Then, the separated captured image is replaced by that having a higher resolution, and the replaced image is recombined. Thus, even a translucent area can have a high resolution.

Fourth Embodiment

In the third embodiment, the HMD 101 transmits a captured image, an information volume of which is reduced by the information volume reduction unit 208, to the image processing apparatus 104. This embodiment will explain a method of replacing a captured image of a translucent area when the captured image is not transmitted to the image processing apparatus 104. Note that the arrangement of an image display system according to this embodiment is the same as that shown in FIG. 1, and a description thereof will not be repeated.

FIG. 19 is a block diagram showing an example of the arrangement of an HMD 101 and image processing apparatus 104 according to this embodiment. Compared to the example shown in FIG. 14, the HMD 101 does not include the information volume reduction unit 208, and includes a position and orientation calculation unit 213 instead. On the other hand, the image processing apparatus 104 does not include the position and orientation calculation unit 224. In this manner, according to this embodiment, the HMD 101 calculates the position and orientation of itself by the same sequence as in the third embodiment, and transmits the position and orientation calculation result to the image processing apparatus 104.

As described above, according to this embodiment, the HMD 101 transmits position and orientation information of itself to the image processing apparatus 104. On the other hand, in place of transmitting position and orientation information from the HMD 101 to the image processing apparatus 104, the image processing apparatus 104 may calculate the position and orientation of the HMD 101 using an external sensor.

In the third embodiment, an image transmitted from the image processing apparatus 104 to the HMD 101 is an image obtained by combining a captured image and CG image. However, in this embodiment, an image obtained by combining an image having a chroma-key color and CG image is transmitted. FIG. 20 is a schematic view of an example of an image to be transmitted from the image processing apparatus 104 to the HMD 101. An area 2001 of FIG. 20 indicates that of pixels of a chroma-key color, and an area 2002 indicates that of a CG image. Also, an area 2004 indicates a translucently combined area.

In this embodiment as well, areas 2003 of pixels, which indicate borders, are included adjacent to the translucent area 2004, and these pixels have a color which is not used except for the borders. Note that this embodiment will also explain the method in which information indicating the translucently combined area is included in the image, as shown in FIG. 20. However, the present invention is not limited to this. Also, in this embodiment, the chroma-key color has a pixel value (R, G, B)=(0, 0, 255). In the third embodiment, the translucently combined area is that obtained by translucently combining a captured image and CG image. However, in this embodiment, an image of the chroma-key color and CG image are translucently combined.

Figure 21:
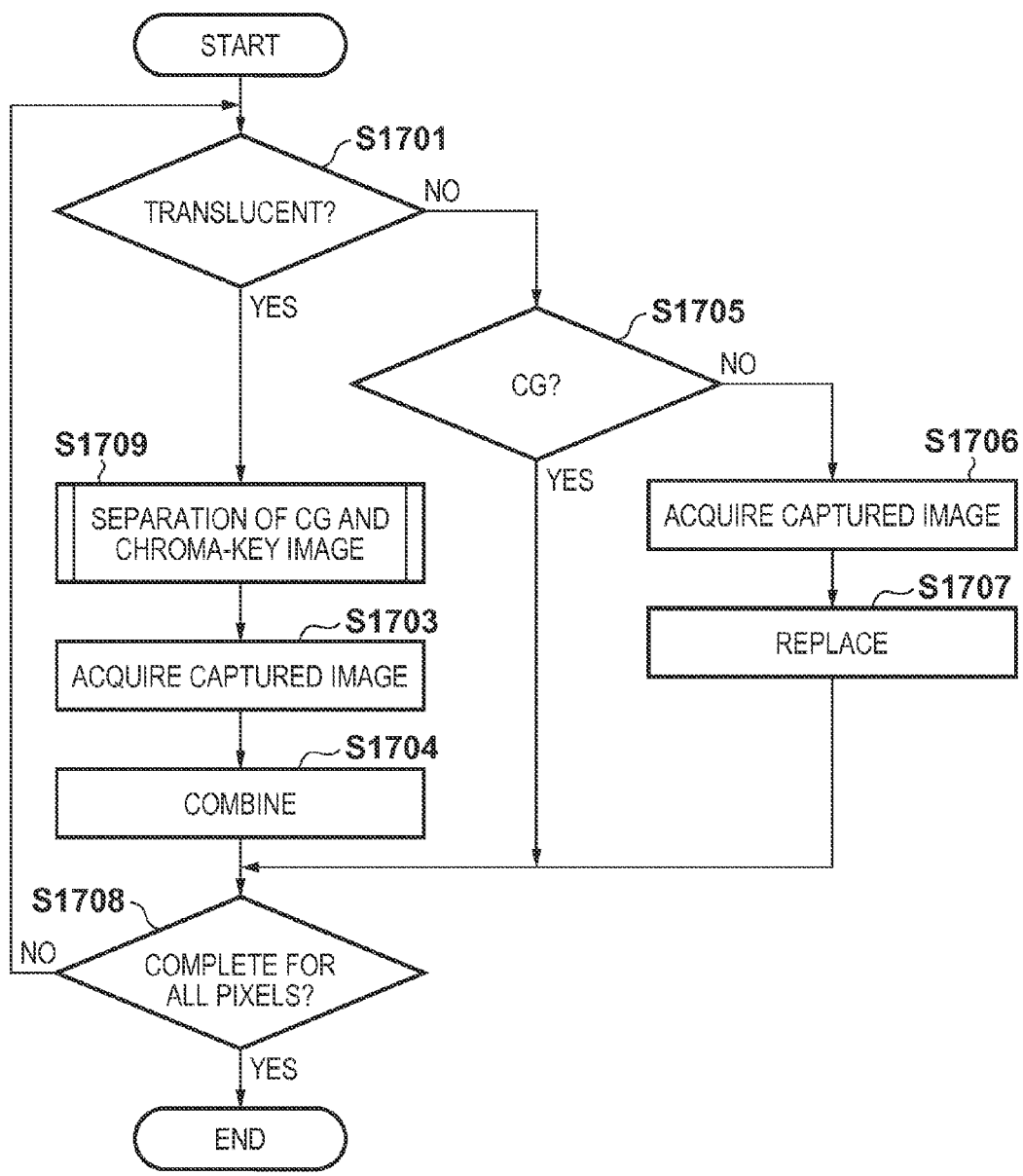
FIG. 21 is a flowchart showing an example of the processing sequence for replacing an area of a captured image and a translucent area at a high resolution in the fourth embodiment.

FIG. 21 is a flowchart showing an example of the processing sequence for replacing an area of the chroma-key color and translucent area by a captured image in this embodiment. Compared to the flowchart shown in FIG. 17, separation processing of a captured image in step S1702 is replaced by that of an image of the chroma-key color and CG image in step S1709. Note that processes other than that of step S1709 are the same as those in FIG. 17, and a description thereof will not be repeated.

Figure 22:
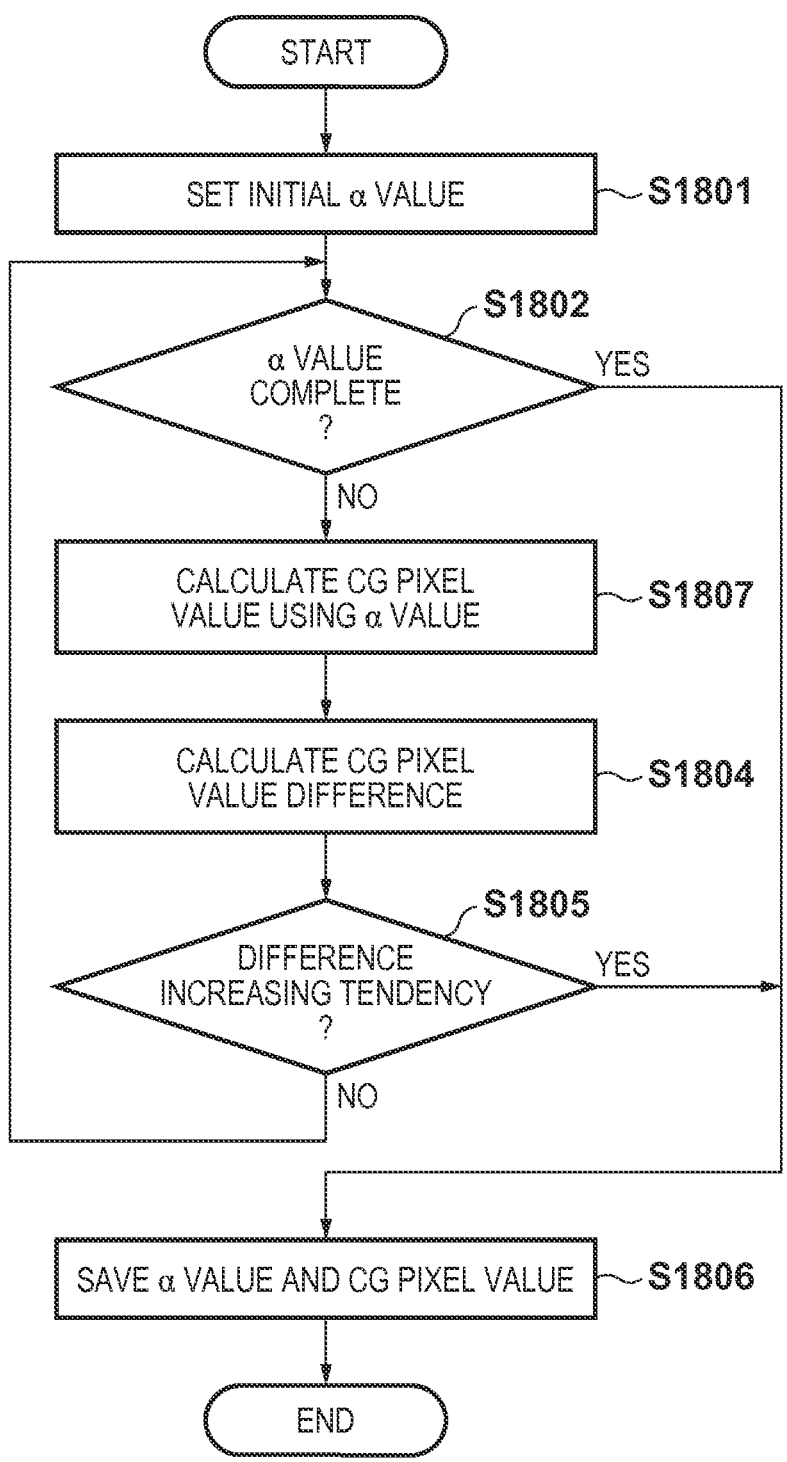
FIG. 22 is a flowchart showing an example of the detailed processing sequence of step S1709 of FIG. 21 in the fourth embodiment.

FIG. 22 is a flowchart showing an example of the detailed processing sequence of step S1709 in FIG. 21. Compared to the flowchart shown in FIG. 18, the processing of step S1803 is replaced by step S1807. In step S1807, a pixel value of the chroma-key color is used in place of that of a captured image. Since other processes are the same as those in FIG. 18, a description thereof will not be repeated.

As described above, according to this embodiment, when a combined image with an image of the chroma-key color is received from the image processing apparatus in place of a combined image with a captured image, a translucent area can be displayed while being replaced by the captured image.

Fifth Embodiment

In the third and fourth embodiments, a general image is used to be separated into those before combination. However, this embodiment will explain a method of using both of right- and left-eye images for 3D images to separate them into images before combination. Note that the arrangement of an image display system according to this embodiment is the same as that shown in FIG. 1, and a description thereof will not be repeated.

FIG. 23 is a block diagram showing an example of the arrangement of an HMD 101 and image processing apparatus 104 according to this embodiment. In this embodiment, since right- and left-eye images are to be handled, the HMD 101 includes image capturing units 2301, information volume reduction units 2302, image processing units 2303, and display units 2304 for the right and left eyes, compared to FIG. 14. Also, the captured image storage unit 207 shown in FIG. 14 is replaced by a right/left image storage unit 2305 which stores captured images for the right and left eyes. In the following description, R and L are attached to reference numerals when the units for the right and left eyes are to be distinguished from each other. However, when the units for the right and left eyes need not be particularly specified, the following description will be given without attaching R and L to reference numerals. Note that the image processing apparatus 104 has the same arrangement as that shown in FIG. 14.

Figure 24:
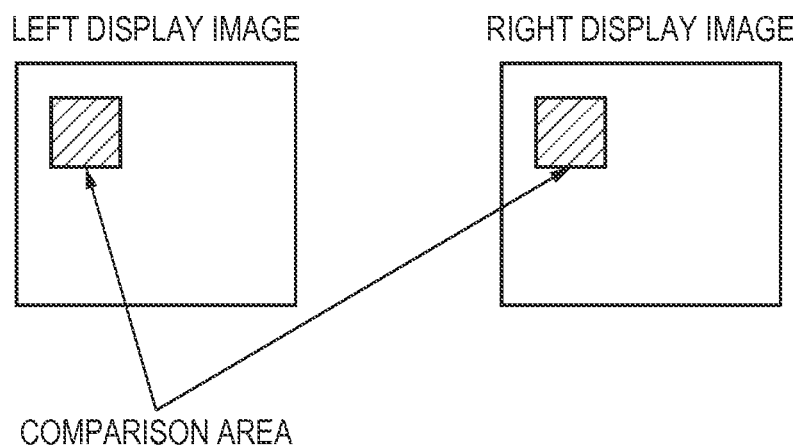
FIG. 24 is a view for explaining comparison target images in the fifth embodiment.

FIG. 24 is a view for explaining comparison target images in this embodiment. In the third and fourth embodiments, eight surrounding pixels of a target pixel are used as comparison targets. However, in this embodiment, pixels at the same positions on the other image on the opposite side are also used as comparison targets. This is because since right and left images are similar images, the other image is also used as a comparison target.

Figure 25:
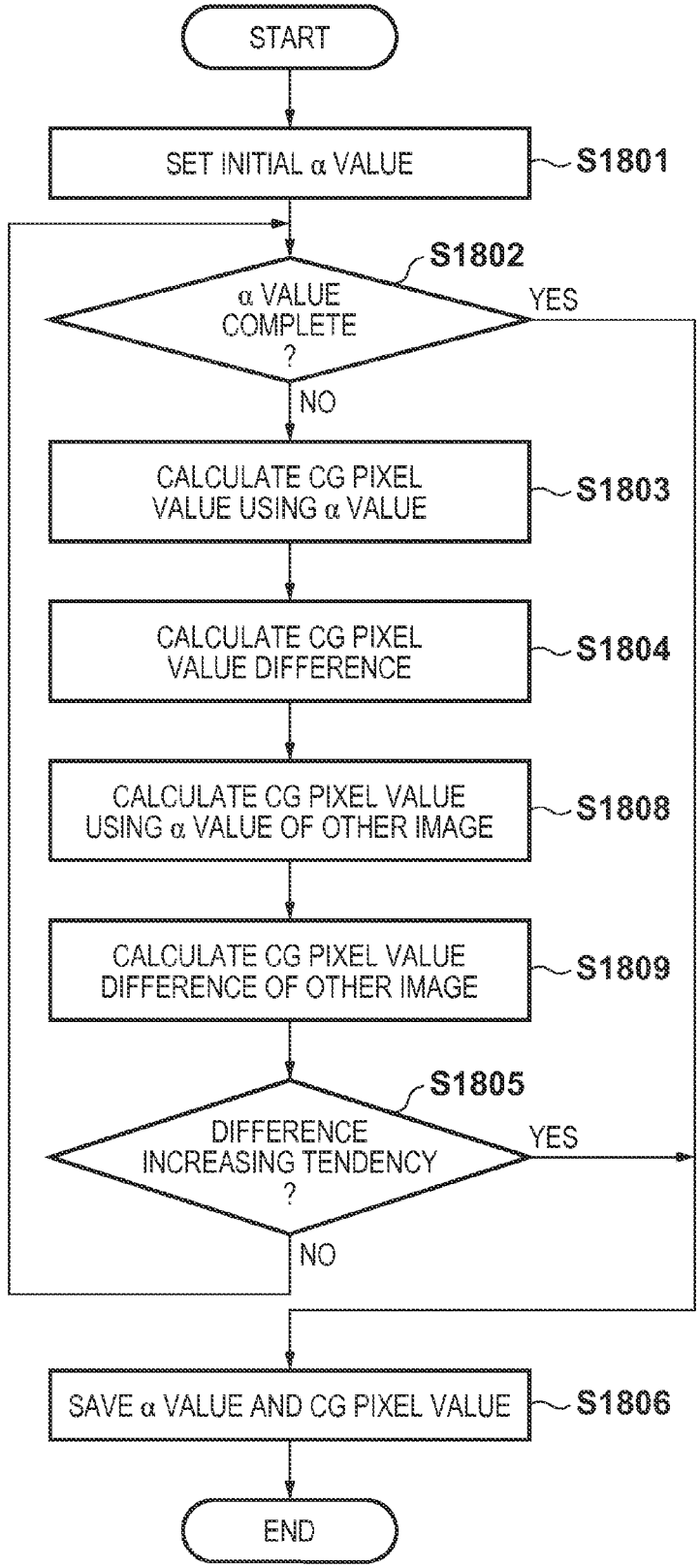
FIG. 25 is a flowchart showing an example of the detailed processing sequence of step S1702 of FIG. 17 in the fifth embodiment.

The processing sequence for replacing an area of a captured image and translucent area by a high resolution image is the same as that shown in FIG. 17, and the detailed sequence for separating a combined image into a CG image and captured image is different from the third embodiment in step S1702. FIG. 25 is a flowchart showing an example of the detailed processing sequence in step S1702 of FIG. 17. A difference from the flowchart of FIG. 18 is that processes of steps S1808 and S1809 are added. Note that other processes are the same as those in FIG. 18, and a description thereof will not be repeated.

In this embodiment, CG pixel values are calculated for either of the right and left eyes to calculate differences (steps S1803 and S1804). After that, pixel values of a CG image using the same α value are also calculated for the other image in step S1808. Then, in step S1809, differences of pixel values of the CG image for the other image are calculated. Note that in step S1806, an α value and pixel values of a CG image when the total of the differences is smallest for both the right- and left-eye images are decided as those before separation. At this time, values when the total of the differences is smallest for both the images may be adopted, or difference values of the other image may be slightly weighted at the time of calculations.

This embodiment may adopt the arrangement in which a captured image is not transmitted from the HMD 101 to the image processing apparatus 104 as in the fourth embodiment. As described above, according to this embodiment, since right- and left-eye images are used they can be more precisely separated into images before combination.

Sixth Embodiment

In the third to fifth embodiments, a translucent area is determined by embedding a start position of the translucent area in an image. However, this embodiment will explain a method of separating a combined image into images before combination by determining a translucent area without embedding any information in an image like in the first embodiment. Since an image display system according to this embodiment and the arrangement of respective apparatuses are basically the same as those shown in FIGS. 1 and 14, a description thereof will not be repeated.

Figure 26:
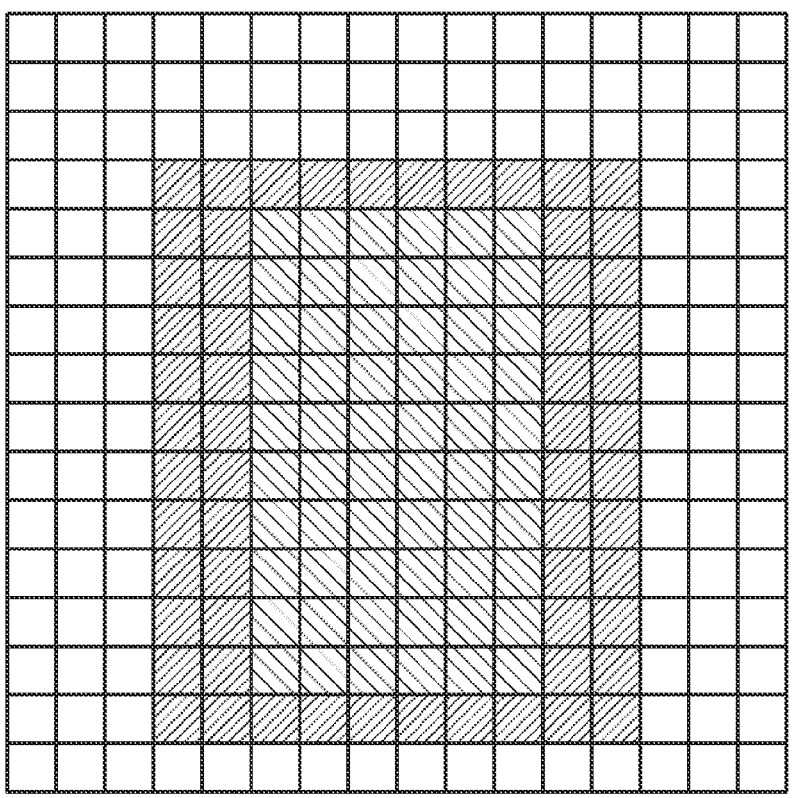
FIG. 26 is a schematic view showing an example of a combined image received from an image processing apparatus in the sixth embodiment.

FIG. 26 is a schematic view showing an example of a combined image which is received from an image processing apparatus 104 by an HMD 101.

In FIG. 26, an area 2601 indicates that of a captured image, and an area 2602 indicates that of a CG image. Also, an area 2603 indicates that of translucent pixels. In the third embodiment, the areas 406 of pixels indicating borders are included as translucent information adjacent to the translucent area 407, as shown in FIG. 16. However, in this embodiment, such areas are not included in a combined image, as shown in FIG. 26.

Whether each pixel is a translucent pixel or CG pixel can be determined by the method described in the first embodiment. Note that in the first embodiment, the area 2601 is that of a background image. However, in this embodiment, this area is that of a captured image. Therefore, by replacing the background image in the description of the first embodiment by the captured image, whether or not each pixel is a translucent pixel or CG pixel can be determined in the same manner as in the first embodiment.

Figure 27:
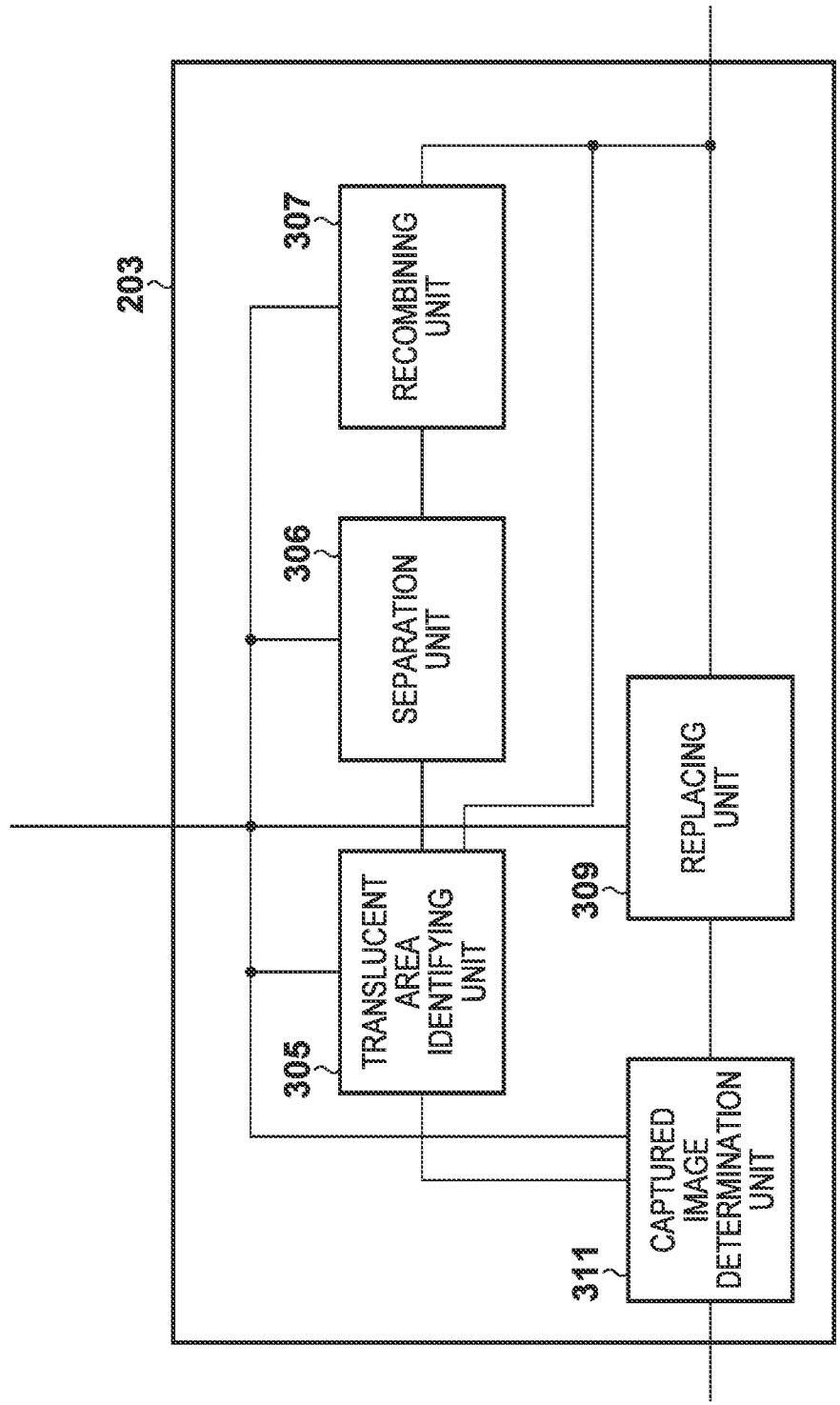
FIG. 27 is a block diagram showing an example of the detailed arrangement of an image processing unit of an HMD shown in FIG. 2 in the sixth embodiment.

FIG. 27 is a block diagram showing an example of the detailed arrangement of an image processing unit 203 of this embodiment.

Referring to FIG. 27, a captured image determination unit 311 determines whether each pixel in an image received from an image processing apparatus 104 is that of a captured image or that different from the captured image. Since an original captured image is stored in a captured image storage unit 207, the captured image determination unit 311 compares the captured image stored in the captured image storage unit 207 and the image received from the image processing apparatus 104 for each pixel. If this comparison result indicates similar pixels, it is determined that the pixel belongs to an area of the captured image, and a replacing unit 309 replaces the pixel by that of the captured image stored in the captured image storage unit 207. Thus, an actually captured image is replaced by a high-resolution image.

On the other hand, if that pixel does not belong to the area of the captured image, a translucent area identifying unit 305 determines whether the pixel is that of a translucent area or that of an area of a CG image. As a determination method, the method described in the first embodiment is used, and when the pixel is that of a translucent area, an α value is also calculated. When the pixel is that of an area of a CG image, data is sent from the image processing unit 203 to a display unit 204 without any processing; when it is that of a translucent area, that data is sent to a separation unit 306.

The separation unit 306 calculates pixel values of a CG image before combination based on an α value calculated by the translucent area identifying unit 305. A recombining unit 307 recombines pixel values of the CG image separated by the separation unit 306 and a corresponding captured image read out from the captured image storage unit 207 using the α value before combination calculated by the translucent area identifying unit 305.

Figure 28:
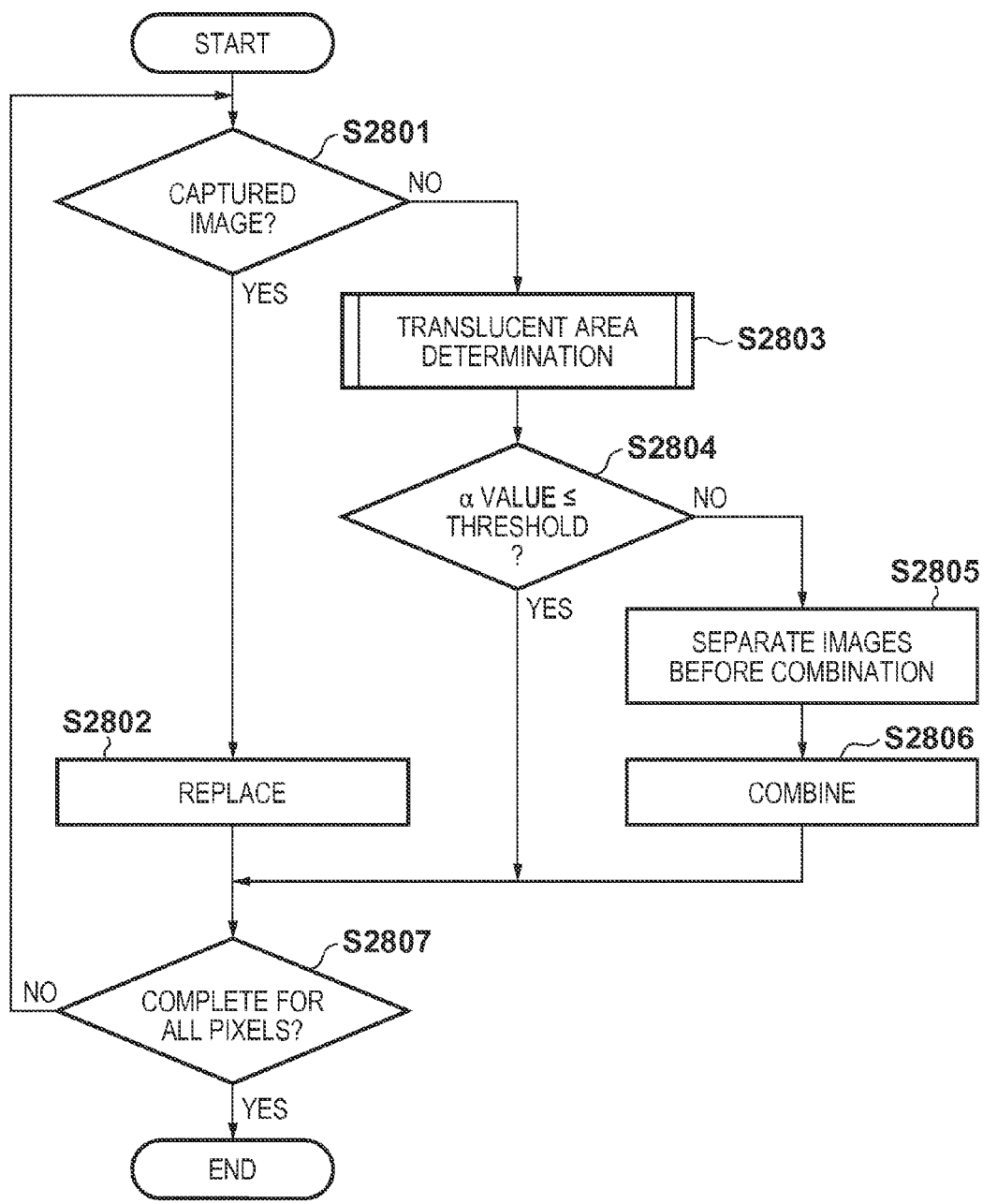
FIG. 28 is a flowchart showing an example of the processing sequence for replacing an area of a captured image and a translucent area at a high resolution in the sixth embodiment.

FIG. 28 is a flowchart showing an example of the processing sequence for replacing an area of a captured image and a translucent area by a high resolution image in this embodiment.

The captured image determination unit 311 determines in step S2801 whether a pixel of a combined image received from the image processing apparatus 104 belongs to an area of a captured image or that other than the captured image by comparing the pixel with that of the captured image acquired from the captured image storage unit 207. As a result of this determination, if the pixel belongs to an area of the captured image, the replacing unit 309 replaces the pixel by that of the captured image acquired from the captured image storage unit 207 in step S2802.

On the other hand, as a result of the determination in step S2801, if the pixel belongs to an area other than the captured image, the translucent area identifying unit 305 determines in step S2803 whether or not the pixel is that of a translucent area. Details of this processing will be described later. In step S2803, it is determined whether the pixel is that of a translucent area or CG area, and in case of the pixel of the translucent area, an α value is also calculated.

Next, the translucent area identifying unit 305 determines in step S2804 whether or not the pixel belongs to the translucent area and the α value is not more than a threshold, as a result of the determination in step S2803. As a result of this determination, if the α value is larger than the threshold, the translucent area identifying unit 305 determines that the pixel is that of the translucent area, and the process advances to step S2805. In step S2805, the separation unit 306 calculates pixel values of a CG image before combination based on the α value calculated in step S2803 and the captured image. Next, in step S2806, the recombining unit 307 combines the captured image acquired from the captured image storage unit 207 using the calculated α value and pixel values of the CG image.

On the other hand, as a result of the determination in step S2804, if the α value is not more than the threshold, the translucent area identifying unit 305 determines that the pixel is that of the area of the CG image, and the process advances to step S2807. It is determined in step S2807 whether or not the processing is complete for all pixels. As a result of this determination, if pixels to be processed still remain, the process returns to step S2801; otherwise, the processing ends.

Figure 29:
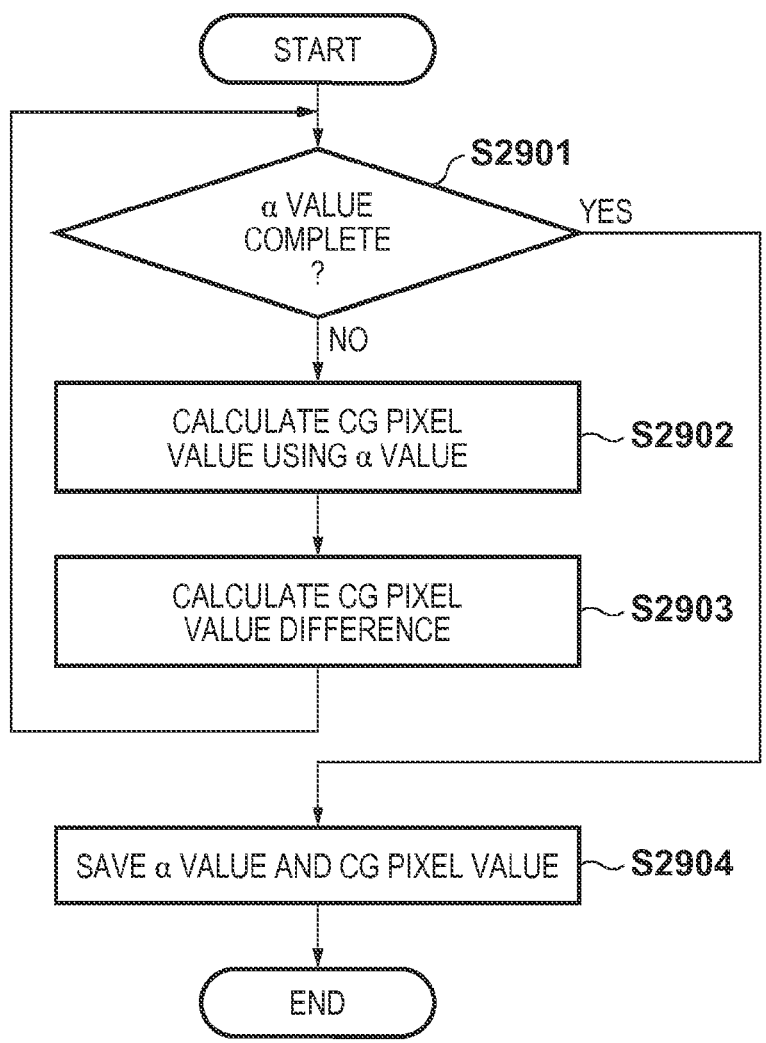
FIG. 29 is a flowchart showing an example of the detailed processing sequence of step S2803 of FIG. 28 in the sixth embodiment.
Figure 30:
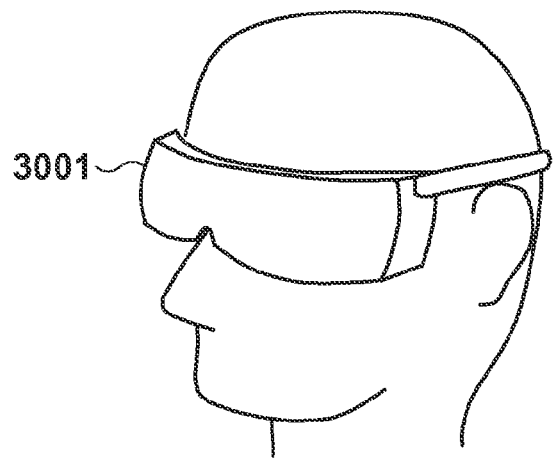
FIG. 30 is a view showing a state in which the user wears an HMD.
Figure 31A:
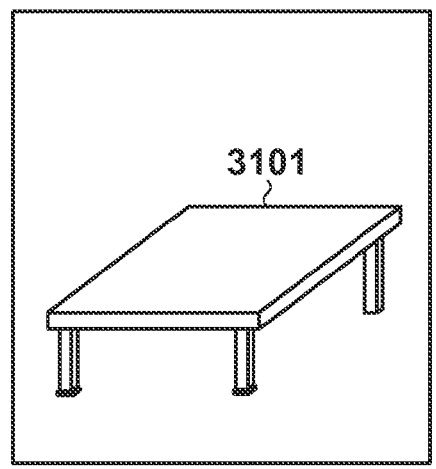
FIGS. 31A to 31C are views showing the concept of combination of a captured image and a CG including a translucent portion.
Figure 31B:
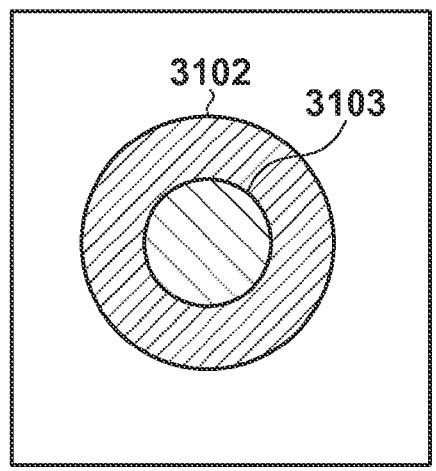
Figure 31C:
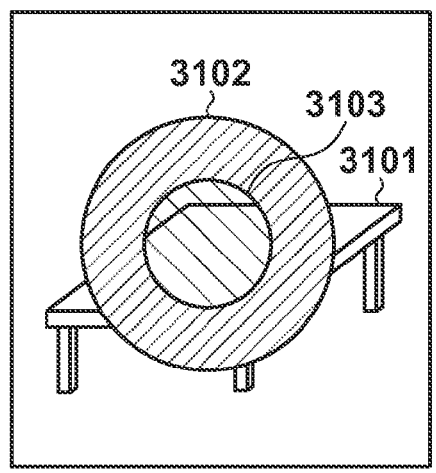

FIG. 29 is a flowchart showing an example of the detailed processing sequence of step S2803 of FIG. 28. Note that all of respective processes shown in FIG. 29 are executed by the translucent area identifying unit 305.

The translucent area identifying unit 305 determines in step S2901 whether or not processing for changing α value within possible values is complete. The processing for changing the α value is the same as that in the third embodiment. As a result of this determination, if calculations for all possible values of the α value are complete, the process jumps to step S2904; otherwise, the process advances to step S2902.

In step S2902, the translucent area identifying unit 305 calculates pixel values of a CG image for a target pixel and eight surrounding pixels using the α value, as shown in FIGS. 7D to 7F. Then, in step S2903, the translucent area identifying unit 305 calculates differences between the pixel values of the target pixel and the surrounding pixels. On the other hand, in step S2904, the translucent area identifying unit 305 saves the α value and pixel values of the CG image when the total of the differences between the target pixel and surrounding pixels calculated in step S2903 is smallest.

As described above, according to this embodiment, even when the need for embedding information indicating borders of a translucent area in an image is obviated, images can be recombined by replacing a captured image having a higher resolution, and even a translucent area can have a higher resolution. Note that the same applies to the fifth embodiment when right- and left-eye images are to be generated.

According to the present invention, for a CG image including a translucent area, the translucent area and its transparency can be identified from an image itself.

Also, according to the present invention, an image can be obtained by combining a captured image and CG image at a high resolution.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-257947 filed on Nov. 26, 2012, and 2013-074022 filed on Mar. 29, 2013, which are hereby incorporated by reference herein in their entirety.

What is claimed is:

1. An image processing apparatus, which determines, for a combined image obtained by combining pixels of a given first image and pixels of an unknown second image either translucently or non-translucently using an unknown coefficient indicating a transparency, whether at least one pixel included in the combined image is a translucently combined pixel, the apparatus comprising:

a calculation unit configured to calculate, from pixel values of the combined image and pixel values of the first image of respective pixels in a predetermined area including one pixel, pixel values of an image corresponding to the second image when each of a plurality of values is used as the coefficient, and to calculate a total of differences between the pixel values of the one pixel and other pixels included in the predetermined area in the image corresponding to the second image;

an estimation unit configured to estimate one of the plurality of values of the coefficient that has a total of differences, which is the smallest among totals of the differences corresponding to the plurality of values of the coefficient, as the coefficient used for the one pixel to obtain the combined image; and a determination unit configured to determine that the one pixel is a pixel obtained by translucently combining the first image and the second image when the estimated value of the coefficient is larger than a predetermined value.

2. The apparatus according to claim 1, further comprising a discrimination unit configured to discriminate, for the one pixel, whether the pixel value of the combined image coincides with the pixel value of the first image, wherein the calculation unit, the estimation unit, and the determination unit are configured to execute processes for the one pixel when the pixel value of the combined image does not coincide with the pixel value of the first image for the one pixel.

3. The apparatus according to claim 2, further comprising:

an image capturing unit configured to capture an image;

a decision unit configured to decide a value of a coefficient indicating a transparency used to combine the captured image and a combination target image as a target to be combined based on the coefficient estimated for the one pixel determined as the translucently combined pixel, and to decide the combination target image based on the decided value of the coefficient, the first image, and the combined image;

a generation unit configured to generate an image having a pixel value of the captured image for a pixel for which the pixel value of the combined image coincides with the pixel value of the first image, having a pixel value obtained by translucently combining the combination target image and the captured image using the decided value of the coefficient for a pixel determined as the translucently combined pixel, and having a pixel value of the combination target image for a pixel for which the pixel value of the combined image does not coincide with the pixel value of the first image and which is not determined as the translucently combined pixel; and a display unit configured to display the generated image.

4. The apparatus according to claim 3, further comprising a transmission unit configured to transmit the generated image to at least one external display apparatus.

5. The apparatus according to claim 4, wherein the generation unit is configured to generate the image for the external display apparatus in addition to an image displayed by the display unit, wherein the generation unit is configured to generate images having different pixel values of pixels determined as the translucently combined pixels as an image to be transmitted to the external display apparatus and an image to be displayed by the display unit.

6. The apparatus according to claim 5, wherein the generation unit is configured to set pixel values of the captured image as pixel values of pixels determined as the translucently combined pixels for the image to be transmitted to the external display apparatus.

7. The apparatus according to claim 5, wherein the generation unit is configured to set pixel values of the combination target image as pixel values of pixels determined as the translucently combined pixels for the image to be transmitted to the external display apparatus.

8. The apparatus according to claim 5, wherein the generation unit is configured to set pixel values of an image obtained by translucently combining the captured image and the combination target image using a value of a coefficient different from the coefficient used to generate an image to be displayed on the display unit as pixel values of pixels determined as the translucently combined pixels for the image to be transmitted to the external display apparatus.

9. The apparatus according to claim 1, wherein the estimation unit is configured to estimate a value of coefficient, which corresponds to a minimum total of the differences each corresponding to the plurality of values of the coefficient, as the coefficient used to obtain the combined image.

10. The apparatus according to claim 1, wherein the predetermined area is an area including the one pixel and eight pixels which surround the one pixel.

11. The apparatus according to claim 1, wherein the predetermined area is an area including the one pixel and eight pixels, which have pixel values having small differences from a pixel value of the one pixel, of a predetermined number of pixels which surround the one pixel.

12. The apparatus according to claim 1, wherein the second image is a color graphics image, and the first image is a predetermined background image.

13. An image processing method, which determines, for a combined image obtained by combining pixels of a given first image and pixels of an unknown second image either translucently or non-translucently using an unknown coefficient indicating a transparency, whether at least one pixel included in the combined image is a translucently combined pixel, the method comprising:

calculating, from pixel values of the combined image and pixel values of the first image of respective pixels in a predetermined area including one pixel, pixel values of an image corresponding to the second image when each of a plurality of values is used as the coefficient, and calculating a total of differences between the pixel values of the one pixel and other pixels included in the predetermined area in the image corresponding to the second image;

estimating one of the plurality of values of the coefficient that has a total of differences, which is the smallest among totals of the differences corresponding to the plurality of values of the coefficient, as the coefficient used for the one pixel to obtain the combined image; and determining that the one pixel is a pixel obtained by translucently combining of the first image and of the second image when the estimated value of the coefficient is larger than a predetermined value.

14. A non-transitory computer-readable storage medium storing a computer program for causing a computer, included in an image processing apparatus which determines, for a combined image obtained by combining pixels of a given first image and pixels of an unknown second image either translucently or non-translucently using an unknown coefficient indicating a transparency, whether at least one pixel included in the combined image is a translucently combined pixel, to:

calculate, from pixel values of the combined image and pixel values of the first image of respective pixels in a predetermined area including one pixel, pixel values of an image corresponding to the second image when each of a plurality of values is used as the coefficient, and calculate a total of differences between the pixel values of the one pixel and other pixels included in the predetermined area in the image corresponding to the second image;

estimate one of the plurality of values of the coefficient that has a total of differences, which is the smallest among totals of the differences corresponding to the plurality of values of the coefficient, as the coefficient used for the one pixel to obtain the combined image; and determine that the one pixel is a pixel obtained by translucently combining the first image and the second image when the estimated value of the coefficient is larger than a predetermined value.

15. An image processing apparatus comprising:

a receiving unit configured to receive a captured image obtained by capturing an image of an external world from an image capturing unit;

a storage unit configured to store the captured image received by the receiving unit;

a reduction unit configured to reduce an information volume of the captured image received by the receiving unit;

an acquisition unit configured to acquire a combined image obtained by combining the captured image, the information volume of which is reduced by the reduction unit, and a computer graphics (CG) image;

an identifying unit configured to identify a translucent area, which was translucently combined, from the combined image acquired by the acquisition unit;

a separation unit configured to separate the captured image, the information volume of which is reduced, and the CG image in the translucent area identified by the identifying unit; and a recombining unit configured to recombine an area of the captured image separated by the separation unit and an area corresponding to the captured image of an area which is not identified as the translucent area by the identifying unit by replacing the areas by the captured image stored in the storage unit, wherein the separation unit is configured to calculate a transparency in the translucent area using a target pixel in the translucent area and surrounding pixels which surround the target pixel, and to separate the captured image, the information volume of which is reduced, and the CG image based on the calculated transparency.

16. The apparatus according to claim 15, wherein the separation unit is configured to calculate a transparency which causes a smallest total of differences between pixel values of the target pixel and the surrounding pixels.

17. The apparatus according to claim 15, wherein the identifying unit is configured to identify an area having a transparency larger than a threshold as the translucent area.

18. The apparatus according to claim 15, wherein the recombining unit is configured to translucently combine images in an area identified as the translucent area by the identifying unit.

19. The apparatus according to claim 15, wherein the reduction unit is configured to reduce at least one of a resolution or color information.

20. The apparatus according to claim 15, wherein the surrounding pixels are eight pixels located around the target pixel.

21. The apparatus according to claim 15, wherein the receiving unit is configured to receive a captured image for a left eye and a captured image for a right eye from the image capturing unit, and
the separation unit is further configured to calculate a transparency using the captured image for the eye on an opposite side.

22. An image processing apparatus comprising:
a receiving unit configured to receive a captured image obtained by capturing an image of an external world from an image capturing unit;
a storage unit configured to store the captured image received by the receiving unit;
an acquisition unit configured to acquire an image combined with a computer graphics (CG) image from an external apparatus;
an identifying unit configured to identify a translucent area, which was translucently combined, from the combined image acquired by the acquisition unit;
a separation unit configured to separate the CG image and an image other than the CG image in the translucent area identified by the identifying unit; and
a recombining unit configured to recombine an area of the image other than the CG image separated by the separation unit and an area which does not correspond to the CG image of an area which is not identified as the translucent area by the identifying unit by replacing the areas by the captured image stored in the storage unit,
wherein the separation unit is configured to calculate a transparency in the translucent area using a target pixel in the translucent area and surrounding pixels which surround the target pixel, and to separate the CG image and the image other than the CG image based on the calculated transparency.

23. An image processing method for an image processing apparatus, which includes a storage unit configured to store a captured image, the method comprising:
receiving a captured image obtained by capturing an image of an external world from an image capturing unit;
saving the captured image received in the receiving to the storage unit;
reducing an information volume of the captured image received in the receiving;
acquiring a combined image obtained by combining the captured image, the information volume of which is reduced in the reducing, and a computer graphics (CG) image;
identifying a translucent area, which was translucently combined, from the combined image acquired in the acquiring;
separating the captured image, the information volume of which is reduced, and the CG image in the translucent area identified in the identifying; and
recombining an area of the captured image separated in the separating and an area corresponding to the captured image of an area which is not identified as the translucent area in the identifying by replacing these areas by the captured image saved to the storage unit,
wherein in the separating, a transparency in the translucent area is calculated using a target pixel in the translucent area and surrounding pixels which surround the target pixel, and the captured image, the information volume of which is reduced, and the CG image are separated based on the calculated transparency.

24. An image processing method for an image processing apparatus, which includes a storage unit configured to store a captured image, the method comprising:
receiving a captured image obtained by capturing an image of an external world from an image capturing unit;
saving the captured image received in the receiving to the storage unit;
acquiring a combined image combined with a computer graphics (CG) image from an external apparatus;
identifying a translucent area, which was translucently combined, from the combined image acquired in the acquiring;
separating the CG image and an image other than the CG image in the transparent area identified in the identifying; and
recombining an area of the image other than the CG image separated in the separating and an area which does not correspond to the CG image of an area which is not identified as the translucent area in the identifying by replacing these areas by the captured image saved to the storage unit,
wherein in the separating, a transparency in the translucent area is calculated using a target pixel in the translucent area and surrounding pixels which surround the target pixel, and the CG image and the image other than the CG image are separated based on the calculated transparency.

25. A non-transitory computer-readable storage medium storing a computer program for causing a computer, included in an image processing apparatus that includes a storage unit configured to store a captured image, to:
receive a captured image obtained by capturing an image of an external world from an image capturing unit;
save the received captured image to the storage unit;
reduce an information volume of the received captured image;
acquire a combined image obtained by combining the captured image, the information volume of which is reduced, and a computer graphics (CG) image;
identify a translucent area, which was translucently combined, from the acquired combined image;
separate the captured image, the information volume of which is reduced, and the CG image in the identified translucent area; and recombine an area of the separated captured image and an area corresponding to the captured image of an area which is not identified as the translucent area by replacing these areas by the captured image saved to the storage unit, wherein a transparency in the translucent area is calculated using a target pixel in the translucent area and surrounding pixels which surround the target pixel, and the captured image, the information volume of which is reduced, and the CG image are separated based on the calculated transparency.

26. A non-transitory computer-readable storage medium storing a computer program for causing a computer, included in an image processing apparatus that includes a storage unit configured to store a captured image, to:

receive a captured image obtained by capturing an image of an external world from an image capturing unit;

save the received captured image to the storage unit;

acquire a combined image combined with a computer graphics (CG) image from an external apparatus;

identify a translucent area, which was translucently combined, from the combined image acquired in the acquiring;

separate the CG image and an image other than the CG image in the identified transparent area; and recombine an area of the image other than the separated CG image and an area which does not correspond to the CG image of an area which is not identified as the translucent area by replacing these areas by the captured image saved to the storage unit, wherein a transparency in the translucent area is calculated using a target pixel in the translucent area and surrounding pixels which surround the target pixel, and the CG image and the image other than the CG image are separated based on the calculated transparency.

27. An information processing apparatus, which determines whether or not at least one pixel included in a combined image obtained by pixels of a given first image and pixels of an unknown second image using an unknown coefficient indicating a transparency is a pixel that is combined using both the first image and the second image, the apparatus comprising:

a calculation unit configured to calculate, from pixel values of the combined image and pixel values of the first image of respective pixels in a predetermined area including one pixel, pixel values of an image corresponding to the second image when each of a plurality of values is used as the coefficient, and to calculate a total of differences between the pixel values of the one pixel and other pixels included in the predetermined area in the image corresponding to the second image;

an estimation unit configured to estimate one of the plurality of values of the coefficient that has a total of differences, which is the smallest among totals of the differences corresponding to the plurality of values of the coefficient, as the coefficient used for the one pixel to obtain the combined image; and a determination unit configured to determine that the one pixel is a pixel which is combined using both the pixel values of the first image and the pixel values of the second image when the estimated value of the coefficient is larger than a predetermined value.

* * * * *